United States Patent
Atkins et al.

(10) Patent No.: US 10,750,887 B2
(45) Date of Patent: Aug. 25, 2020

(54) FOOD SERVICE EQUIPMENT AND SYSTEMS

(71) Applicant: BRASS SMITH INNOVATIONS, LLC, Wilmington, DE (US)

(72) Inventors: Scott Atkins, Denver, CO (US); Wayne Sirmons, Denver, CO (US)

(73) Assignee: BRASS SMITH INNOVATIONS, LLC, Wilmington, DE (US)

(*) Notice: Subject to any disclaimer, the term of this patent is extended or adjusted under 35 U.S.C. 154(b) by 242 days.

(21) Appl. No.: 16/035,021

(22) Filed: Jul. 13, 2018

(65) Prior Publication Data

US 2018/0317671 A1 Nov. 8, 2018

Related U.S. Application Data

(62) Division of application No. 13/920,915, filed on Jun. 18, 2013, now Pat. No. 10,058,198.

(51) Int. Cl.
  *A47F 10/06* (2006.01)
  *H04R 1/02* (2006.01)
  *H04N 5/775* (2006.01)

(52) U.S. Cl.
  CPC ........ *A47F 10/06* (2013.01); *A47F 2010/065* (2013.01); *H04N 5/775* (2013.01); *H04R 1/028* (2013.01)

(58) Field of Classification Search
  CPC .... A47F 10/06; A47F 2010/065; A47F 5/005; H04R 1/028; H04N 5/775; H04N 5/85
  USPC ........ 99/645; 386/230, 353; 312/137, 140.1, 312/140.2, 140.3, 140.4; 248/122.1
  See application file for complete search history.

(56) References Cited

U.S. PATENT DOCUMENTS

| | | |
|---|---|---|
| 54,248 A | 4/1866 | Eddy |
| 90,297 A | 5/1869 | Perry et al. |
| 93,763 A | 8/1869 | Stoddard |
| 147,362 A | 2/1874 | Boudren |
| 255,123 A | 3/1882 | Starrett |
| 257,646 A | 5/1882 | Beseler |
| 342,650 A | 5/1886 | Smith |
| 369,143 A | 8/1887 | White |
| 369,971 A | 9/1887 | Stillman |
| 384,784 A | 6/1888 | Pihl |
| 406,299 A | 7/1889 | Overpack |
| 423,434 A | 3/1890 | Lotto |

(Continued)

FOREIGN PATENT DOCUMENTS

WO    1998050728 A1    11/1998

OTHER PUBLICATIONS

1 Guard Portable Brochure, downloaded on or before Oct. 9, 2007, 1 page.

(Continued)

*Primary Examiner* — Reginald Alexander
(74) *Attorney, Agent, or Firm* — Adsero IP

(57) ABSTRACT

Food service equipment may include a hygienic shield system. The hygienic shield system may include a frame that is coupled to a serving surface of the food service equipment. At least one clear or transparent panel may be coupled to the frame. The food service equipment may include a media device or system that is integrated within or on the food service equipment. The media device may be configured to playback one of audio and video of a media file. The food service equipment may include a controller configured to select the one of audio and video of the media file for playback by the media device.

20 Claims, 14 Drawing Sheets

(56) References Cited

U.S. PATENT DOCUMENTS

| | | |
|---|---|---|
| 432,614 A | 7/1890 | Hendrick |
| 462,319 A | 11/1891 | Loehner et al. |
| 476,806 A | 6/1892 | Mauser |
| 502,601 A | 8/1893 | Anderson |
| 517,677 A | 4/1894 | Bender |
| 546,081 A | 9/1895 | Reyer |
| 551,358 A | 12/1895 | Benecke |
| 554,459 A | 2/1896 | Rockwell |
| 555,025 A | 2/1896 | Ruffhead et al. |
| 557,575 A | 4/1896 | Gibson et al. |
| 560,879 A | 5/1896 | Williams |
| 566,360 A | 8/1896 | White |
| 568,649 A | 9/1896 | Whittington |
| 575,711 A | 1/1897 | Haley |
| 575,857 A | 1/1897 | Sly |
| 576,769 A | 2/1897 | Williams |
| 577,974 A | 3/1897 | Williams |
| 578,014 A | 3/1897 | Homan |
| 581,991 A | 5/1897 | Homan |
| 585,406 A | 6/1897 | Rhind |
| 596,689 A | 1/1898 | Aungst |
| 596,762 A | 1/1898 | Sevison |
| 597,947 A | 1/1898 | Bragger |
| 599,467 A | 2/1898 | Beardsley |
| 600,642 A | 3/1898 | Hartman |
| 621,374 A | 3/1899 | Rhind |
| 625,944 A | 5/1899 | White |
| 632,858 A | 9/1899 | Waibel |
| 642,906 A | 2/1900 | Hedgeland |
| 663,121 A | 12/1900 | Frost |
| 763,380 A | 6/1904 | Eble et al. |
| 767,484 A | 8/1904 | Maltby |
| 795,602 A | 7/1905 | Fyfe |
| 842,007 A | 1/1907 | Parker |
| 842,313 A | 1/1907 | Harrison |
| 903,593 A | 11/1908 | Lowendahl |
| 926,114 A | 6/1909 | Hall |
| 926,840 A | 7/1909 | Bagaason |
| 953,156 A | 3/1910 | Rasmussen |
| 959,099 A | 5/1910 | Anderson |
| 963,913 A | 7/1910 | Lyhne |
| 964,840 A | 7/1910 | Bernau |
| 970,751 A | 9/1910 | Pranke |
| 1,047,817 A | 12/1912 | Knight |
| 1,056,574 A | 3/1913 | Newton |
| 1,057,658 A | 4/1913 | Nichols |
| 1,074,272 A | 9/1913 | Kline |
| 1,094,272 A | 4/1914 | Thornley |
| 1,106,485 A | 8/1914 | Becker |
| 1,132,554 A | 3/1915 | Brett |
| 1,137,333 A | 4/1915 | Klorer |
| 1,178,072 A | 4/1916 | Hoag |
| 1,190,050 A | 7/1916 | Verba |
| 1,190,502 A | 7/1916 | Anderson |
| 1,206,871 A | 12/1916 | Locke |
| 1,217,838 A | 2/1917 | Schmidt |
| 1,227,258 A | 5/1917 | Godley |
| 1,231,635 A | 7/1917 | Nelson |
| 1,266,399 A | 5/1918 | Burtis |
| 1,286,352 A | 12/1918 | Kubat |
| 1,290,252 A | 1/1919 | Lester et al. |
| 1,303,249 A | 5/1919 | Brown |
| 1,303,345 A | 5/1919 | McFeaters |
| 1,303,981 A | 5/1919 | Stafford |
| 1,324,456 A | 12/1919 | Lutz |
| 1,328,930 A | 1/1920 | Stern |
| 1,342,626 A | 6/1920 | Frank |
| 1,345,157 A | 6/1920 | Francisco |
| 1,346,402 A | 7/1920 | Glaudel |
| 1,353,552 A | 9/1920 | Sweet |
| 1,354,873 A | 10/1920 | Bartley et al. |
| 1,356,213 A | 10/1920 | Loyd |
| 1,358,159 A | 11/1920 | Kern |
| 1,358,262 A | 11/1920 | Sumner |
| 1,358,422 A | 11/1920 | D'Esopo |
| 1,358,792 A | 11/1920 | Shogran |
| 1,359,645 A | 11/1920 | Zink |
| 1,371,703 A | 3/1921 | Miller |
| 1,372,492 A | 3/1921 | Doyle |
| 1,373,840 A | 4/1921 | Smith |
| 1,375,888 A | 4/1921 | Baer |
| 1,385,485 A | 7/1921 | Comrie |
| 1,386,565 A | 8/1921 | Glaudel |
| 1,389,053 A | 8/1921 | King |
| 1,389,901 A | 9/1921 | Rosenbluth |
| 1,389,935 A | 9/1921 | Carroll |
| 1,393,158 A | 10/1921 | Pawsat |
| 1,393,681 A | 10/1921 | Glaudel |
| 1,399,461 A | 12/1921 | Childs |
| 1,401,402 A | 12/1921 | Hawthorne |
| 1,403,863 A | 1/1922 | Peat |
| 1,408,834 A | 3/1922 | Seavey |
| 1,412,690 A | 4/1922 | Leuckert |
| 1,430,379 A | 9/1922 | Hubbell |
| 1,434,714 A | 11/1922 | McMullen |
| 1,435,310 A | 11/1922 | Kipper |
| 1,441,913 A | 1/1923 | Darling |
| 1,453,685 A | 5/1923 | Longenbaugh |
| 1,454,390 A | 5/1923 | Loranger |
| 1,460,313 A | 6/1923 | Davis |
| 1,461,289 A | 7/1923 | Primrose |
| 1,461,398 A | 7/1923 | McMullen |
| 1,465,213 A | 8/1923 | Feinberg |
| 1,470,553 A | 10/1923 | Church |
| 1,488,986 A | 4/1924 | Hood |
| 1,489,934 A | 4/1924 | Eklund |
| 1,490,304 A | 4/1924 | Zink |
| 1,493,609 A | 5/1924 | Dailey |
| 1,494,033 A | 5/1924 | Stevens |
| 1,503,357 A | 7/1924 | Ensign |
| 1,503,638 A | 8/1924 | Cooper |
| 1,504,767 A | 8/1924 | Hodny |
| 1,507,094 A | 9/1924 | Schoenborn |
| 1,512,291 A | 10/1924 | McGuire |
| 1,515,867 A | 11/1924 | Masone |
| 1,522,476 A | 1/1925 | Albright |
| 1,527,998 A | 3/1925 | Serpico |
| 1,538,340 A | 5/1925 | Hodny |
| 1,547,794 A | 7/1925 | Curry |
| 1,558,641 A | 10/1925 | Short |
| 1,574,899 A | 3/1926 | Kellogg |
| 1,580,316 A | 4/1926 | Moreton |
| 1,590,562 A | 6/1926 | Blonigen |
| 1,597,943 A | 8/1926 | Wihelm |
| 1,628,623 A | 5/1927 | Jonnes |
| 1,706,215 A | 3/1929 | Davidson |
| 1,721,271 A | 7/1929 | Du Prel |
| 1,732,534 A | 10/1929 | Riches |
| 1,735,212 A | 11/1929 | Pawsat |
| 1,737,214 A | 11/1929 | Brown |
| 1,745,695 A | 2/1930 | Hunter |
| 1,793,911 A | 2/1931 | Dann |
| 1,814,500 A | 7/1931 | Summerbell |
| 1,835,473 A | 12/1931 | Davidson |
| 1,849,001 A | 3/1932 | Fisher |
| 1,936,529 A | 6/1932 | Taylor |
| 1,932,697 A | 10/1933 | Jankovic |
| 1,941,032 A | 12/1933 | Knowles |
| 1,989,691 A | 2/1935 | Hirt |
| 2,010,058 A | 8/1935 | Carlson |
| 2,038,906 A | 4/1936 | Ruhland |
| 2,066,699 A | 1/1937 | Skelton |
| 2,073,089 A | 3/1937 | Autenrieth |
| 2,074,247 A | 3/1937 | Armstrong |
| 2,124,006 A | 7/1938 | Parker |
| 2,163,859 A | 6/1939 | Ver Bockel |
| 2,177,921 A | 10/1939 | Zofrey |
| 2,220,429 A | 11/1940 | Soderberg |
| 2,257,169 A | 9/1941 | Hopps |
| 2,258,175 A | 10/1941 | Coleman |
| 2,287,890 A | 6/1942 | Legassey |
| 2,289,422 A | 7/1942 | Grotnes |
| 2,290,874 A | 7/1942 | Graff |
| 2,315,132 A | 3/1943 | Powers |

(56) References Cited

U.S. PATENT DOCUMENTS

| | | |
|---|---|---|
| 2,331,132 A | 10/1943 | Nadelson |
| 2,338,124 A | 1/1944 | Martinek |
| 2,360,482 A | 10/1944 | Evans |
| 2,365,935 A | 12/1944 | Boggs |
| 2,370,748 A | 3/1945 | O'Donnell |
| 2,433,550 A | 12/1947 | Graham |
| 2,456,505 A | 12/1948 | Hastings |
| 2,511,590 A | 6/1950 | Keck |
| 2,548,650 A | 4/1951 | Brandt |
| 2,596,627 A | 5/1952 | Wahnish |
| 2,609,938 A | 9/1952 | Wells |
| 2,635,345 A | 4/1953 | Samborski |
| 2,651,725 A | 9/1953 | McFarland |
| 2,696,996 A | 12/1954 | Engelhardt |
| 2,719,691 A | 10/1955 | Vance |
| 2,733,035 A | 1/1956 | Rocheleau |
| 2,741,497 A | 4/1956 | Risley |
| 2,767,003 A | 10/1956 | Gilmont |
| 2,783,015 A | 2/1957 | Kampa |
| 2,899,772 A | 8/1959 | Paulsen et al. |
| 3,026,162 A | 4/1960 | Waszkiewicz |
| 2,970,798 A | 2/1961 | Fritchie et al. |
| 3,069,189 A | 12/1962 | Hollaender |
| 3,081,896 A | 3/1963 | Hoskins |
| 3,096,109 A | 7/1963 | Callahan |
| 3,113,791 A | 12/1963 | Frost et al. |
| 3,118,695 A | 1/1964 | Engelhardt |
| 3,126,100 A | 3/1964 | Christensen |
| 3,126,191 A | 3/1964 | Holden |
| 3,160,349 A | 12/1964 | Kent |
| 3,212,713 A | 10/1965 | Culver |
| 3,237,899 A | 3/1966 | Lewis |
| 3,265,434 A | 8/1966 | Bolotin |
| 3,269,683 A | 8/1966 | Shinaver |
| D206,198 S | 11/1966 | Molitor |
| 3,389,882 A | 6/1968 | Schlosser |
| 3,405,587 A | 10/1968 | Meazzi et al. |
| 3,484,066 A | 12/1969 | Aunspaugh |
| 3,499,679 A | 3/1970 | Olander |
| 3,500,594 A | 3/1970 | O'Brien |
| 3,581,354 A | 6/1971 | Usiskin |
| 3,610,562 A | 10/1971 | Holmes et al. |
| 3,640,498 A | 2/1972 | Aleks |
| 3,734,439 A | 5/1973 | Wintz |
| 3,738,606 A | 6/1973 | Mille |
| 3,828,403 A | 8/1974 | Perrin et al. |
| 3,837,383 A | 9/1974 | Ko |
| 3,843,083 A | 10/1974 | Angibaud |
| 3,921,539 A | 11/1975 | Berger |
| 4,047,684 A | 9/1977 | Kobayashi |
| 4,050,661 A | 9/1977 | Wooldridge |
| 4,115,966 A | 9/1978 | DeLee |
| 4,126,081 A | 11/1978 | Zdeb |
| 4,132,178 A | 1/1979 | Mueller et al. |
| 4,162,647 A | 7/1979 | Aslen |
| 4,237,798 A | 12/1980 | Welsch et al. |
| 4,286,897 A | 9/1981 | Suskind |
| 4,307,864 A | 12/1981 | Benoit |
| 4,338,875 A | 7/1982 | Lisowski |
| 4,443,128 A | 4/1984 | Yamamoto et al. |
| 4,452,416 A | 6/1984 | Templeton |
| 4,483,334 A | 11/1984 | Murray |
| 4,511,158 A | 4/1985 | Varga et al. |
| 4,547,092 A | 10/1985 | Vetter et al. |
| 4,624,374 A | 11/1986 | Murtaugh |
| 4,672,898 A | 6/1987 | Davidson |
| 4,729,535 A | 3/1988 | Frazier et al. |
| 4,747,569 A | 5/1988 | Hoshino |
| 4,799,444 A | 1/1989 | Lisowski |
| 4,801,115 A | 1/1989 | Heard |
| 4,821,382 A | 4/1989 | Puschkarski |
| 4,860,909 A | 8/1989 | Leumi |
| 4,884,927 A | 12/1989 | Menker |
| 4,892,366 A | 1/1990 | Yerman |
| 4,915,418 A | 4/1990 | Palatchy |
| 4,917,343 A | 4/1990 | Wainscott |
| D309,540 S | 7/1990 | Suttles et al. |
| 4,953,819 A | 9/1990 | Davis |
| 4,964,603 A | 10/1990 | Yair |
| 4,967,693 A | 11/1990 | Prue |
| 4,976,486 A | 12/1990 | Rifaat |
| 5,002,247 A | 3/1991 | Dispenza et al. |
| 5,023,755 A | 6/1991 | Rosenberg |
| 5,056,854 A | 10/1991 | Rosen |
| 5,111,956 A | 5/1992 | Jow |
| 5,128,838 A | 7/1992 | Brandess |
| D330,555 S | 10/1992 | Lilly |
| D332,497 S | 1/1993 | Shufelt |
| 5,199,680 A | 4/1993 | Rivera |
| D337,462 S | 7/1993 | La Vaute et al. |
| 5,259,582 A | 11/1993 | DeLange |
| 5,301,999 A | 4/1994 | Thompson et al. |
| 5,359,866 A | 11/1994 | Boddy |
| 5,409,122 A | 4/1995 | Lazarus |
| 5,427,344 A | 6/1995 | Beauchemin |
| 5,449,138 A | 9/1995 | Ciancio |
| 5,509,180 A | 4/1996 | Benetti et al. |
| 5,551,660 A | 9/1996 | Leduchowski |
| 5,566,911 A | 10/1996 | Hoshino |
| 5,584,545 A | 12/1996 | La Vaute et al. |
| 5,589,903 A | 12/1996 | Speggiorin |
| 5,634,619 A | 6/1997 | Alessi |
| 5,681,017 A | 10/1997 | Clausen |
| 5,704,232 A | 1/1998 | Kuo |
| 5,735,499 A | 4/1998 | Phillips et al. |
| 5,746,334 A | 5/1998 | Brandenberg |
| 5,775,652 A | 7/1998 | Crawshaw et al. |
| 5,782,743 A | 7/1998 | Russell |
| 5,791,609 A | 8/1998 | Hankins |
| 5,819,378 A | 10/1998 | Doyle |
| 5,826,850 A | 10/1998 | Goldsmith |
| 5,964,052 A | 10/1999 | Jepsen et al. |
| 5,964,439 A | 10/1999 | Johnson |
| 5,974,984 A | 11/1999 | Mitjans |
| 6,061,939 A | 5/2000 | Gildea |
| 6,093,878 A | 7/2000 | Hoshino |
| 6,132,018 A | 10/2000 | McGrath |
| 6,189,459 B1 | 2/2001 | DeAngelis |
| 6,209,835 B1 | 4/2001 | Walrath et al. |
| 6,274,797 B1 | 8/2001 | Liao |
| 6,293,035 B1 | 9/2001 | LaPointe |
| 6,328,269 B1 | 12/2001 | Krautloher |
| 6,390,424 B1 | 5/2002 | Kidushim et al. |
| 6,523,230 B1 | 2/2003 | Weinhold |
| 6,554,238 B1 | 4/2003 | Hibberd |
| 6,588,863 B1 | 7/2003 | Yatchak et al. |
| 6,601,328 B1 | 8/2003 | Benaquista et al. |
| 6,631,876 B1 | 10/2003 | Phillips |
| 7,261,263 B2 | 8/2007 | Baker et al. |
| 8,302,919 B1 | 11/2012 | McGrath |
| 8,403,430 B2 | 3/2013 | Atkins |
| 2003/0057810 A1 | 3/2003 | Dewitt |
| 2004/0202506 A1 | 10/2004 | Lazic et al. |
| 2004/0226903 A1 | 11/2004 | Wang |
| 2005/0097802 A1 | 5/2005 | Kim |
| 2005/0251940 A1 | 11/2005 | Black |
| 2006/0102818 A1 | 5/2006 | Carnevali |
| 2007/0177754 A1 | 8/2007 | Kemmerer |
| 2007/0200036 A1 | 8/2007 | Hsieh |
| 2007/0236112 A1 | 10/2007 | Williman |
| 2008/0029661 A1 | 2/2008 | Chen |
| 2008/0164395 A1 | 7/2008 | Chang et al. |
| 2009/0084019 A1 | 4/2009 | Carnevali |
| 2009/0224122 A1 | 9/2009 | Liao |
| 2011/0079692 A1 | 4/2011 | Li |

OTHER PUBLICATIONS

2-D Adjustable Sneezeguard Brochure, downloaded on or before Oct. 9, 2007, 2 pages.

Ambassador Angled Divider Specifications, downloaded on or before Oct. 9, 2007, 2 pages.

(56) References Cited

OTHER PUBLICATIONS

Ambassador Angled Stationary Sneezeguard Specifications, downloaded on or before Oct. 9, 2007, 2 pages.
Ambassador Vertical Divider Specifications, downloaded on or before Oct. 9, 2007, 2 pages.
Ambassador Vertical Stationary Sneezeguard Specifications, downloaded on or before Oct. 9, 2007, 2 pages.
Angled Divider Stationary Sneezeguard Specifications, downloaded on or before Oct. 9, 2007, 2 pages.
Brochure: Brass Smith, Inc.: A Guide to the Design and Use of the Decorative, User-Friendly Food Guard, Apr. 1998, 13 pages.
Canadian Display Systems Inc., http://www.canadiandisplaysystems.com, downloaded Oct. 5, 2007, 2 pages.
Canadian Display Systems Inc., Portable Sneezeguard—PSG 19, Specifications, downloaded Jun. 1, 2005, 2 pages.
Carlisle Food Service Products, Price List, downloaded 2006, 2 pages.
Carousel Sneezeguard Specifications, downloaded on or before Oct. 9, 2007, 2 pages.
Custom Sneezeguard Form, downloaded on or before Oct. 9, 2007, 1 page.
Declaration of Alan Levine, Case No. 07-CV-01778-MSK, Oct. 5, 2007, 4 pages.
Declaration of Michael Vogel, Case No. 07-CV-01778-MSK, Oct. 5, 2007, 2 pages.
Defendant Lawrence Metal Products, Inc.'s Response to Brass Smith's Implicit Request for Preliminary Injunction, Case No. 07-CV-01778-MSK-BNB, filed Oct. 8, 2007, 14 pages.
Document Deco-Tech Model Deco-900, Adjustable Vertical Display Spec, Jun. 1, 2003, 1 page.
Document Vieler International Bistro 1, downloaded on or before Oct. 9, 2007, 1 page.
Flexaguard Portable Sneeze Guard, http://www.flexaguard.com.index.html., downloaded on or before Oct. 5, 2007, 2 pages.
Flexaguard Portable Sneeze Guard, Specifications and http://www.flexaguard.com/spec.html. downloaded on or before Oct. 5, 2007, 3 pages.
Folding Portable Sneezeguard Installation Brochure and Specification, four pages, downloaded on or before Oct. 9, 2007, 4 pages.
Front Mount Stationary Sneezeguard Brochure, downloaded on or before Oct. 9, 2007, 2 pages.
Kevry Corporation Brochure, Deco 900 Fully Adjustable, General Specifications, downloaded 2007, 4 pages.
Low Profile Folding Portable Sneezeguard Installation Brochure, downloaded on or before Oct. 9, 2007, 2 pages.
High-Profile Folding Portable Sneezeguard Brochure, downloaded on or before Oct. 9, 2007, 2 pages.
Maintenance Solutions Brochure, downloaded on or before Oct. 9, 2007, 1 page.
Mid-Mount Stationary SneezeQuard Specifications, downloaded on or before Oct. 9, 2007, 2 pages.
Notice of Filing Corrected Exhibit G to Defendant Lawrence Metal Products, Inc.'s Response to Brass Smith's Implicit Request for Preliminary Injunction, Case No. 07-CV-01778-MSK-BNB, filed Oct. 9, 2007, 2 pages.
Premier Brass, Fast-Guard Online Design and Specification, http://www.premierbrass.com/, downloaded on or before Oct. 9, 2007, 4 pages.
Product Information: Brass Smith, Inc.: Hospitality, Sep. 1999, 13 pages.
Product Information: Food Guard Information, downloaded on or before Oct. 9, 2007, 2 pages.
Product Information: HAFELE Multi-Purpose Pole Mount System 5.106-5.107, downloaded on or before Oct. 9, 2007, 2 pages.
Product Information: IKEA 2003 Holidays at Home, 3 pages.
Product Information: Moffat Bulk Food Regeneration Trolley Model VGEN 8 AIR Product Information, downloaded on or before Oct. 9, 2007, 1 page.
Product Information: RHO with pictures, downloaded on or before Oct. 9, 2007, 7 pages.
Product Information: Unic Camionnette Dec. 16, 2003, 1 page.
QBD Modular Systems Inc., Sneezeguard Kits Brochure, downloaded on or before Oct. 9, 2007, 2 pages.
Sampler SneezeGuard Brochure, downloaded on or before Oct. 9, 2007, 3 pages.
Serpentine Sneezeguard Specifications, downloaded on or before Oct. 9, 2007, 2 pages.
Sneezequard Accessories Brochure, downloaded on or before Oct. 9, 2007, 2 pages.
Sneezeguard Replacement Hardware Brochure, downloaded on or before Oct. 9, 2007, 2 pages.
Sneezeguard Replacement Stands Brochure, downloaded on or before Oct. 9, 2007, 4 pages.
Sneezeguards Specifications: B-445, downloaded on or before Oct. 9, 2007, 2 pages.
Specification Sheet: Moffat Range of Gantrise 6/2 Issue 5, downloaded on or before Oct. 9, 2007, 1 page.
Specifications: Kevry Deco-Tech Self-Serve Food Shield Portable Rev. 2.3 DEC0-270, -271,-272, -273 May 2002, 5 pages.
Storcart Accessories Brochure, downloaded on or before Oct. 9, 2007, 2 pages.
Storcases Brochure, downloaded on or before Oct. 9, 2007, 2 pages.
The Sneezeguard Storcart Specifications, downloaded on or before Oct. 9, 2007, 2 pages.
Vertical Divider Stationary Sneezeguard Specifications, downloaded on or before Oct. 9, 2007, 2 pages.
Vollarth Co., Product Information: Signature Server, Access Breath Guard, downloaded on or before Oct. 9, 2007, 1 page.
Wall Storaqe Units Specifications, downloaded on or before Oct. 9, 2007, 2 pages.
Website printout: Bernstein Display: Bravo (www.bernsteindisplay.com) Dec. 21, 2003, 6 pages.
Website printout: Forms+ Surfaces: Silhouette Railing System, Profile One Information System (www.forms-surfaces.com), Dec. 21, 2003, 5 pages.
Website printout: IKEA: Stolmen Mounting Fitting (www.ikea.com.au), Nov. 9, 2003, 1 page.
Website printout: Kevry Catalog Products (www.kevry.com) 2003, 3 pages.
Website printout: RHO (www.rho.ca), Dec. 21, 2003, 3 pages.
Website printout: visplaybeam.com, Gallery Dec. 21, 2003, 6 pages.
Website printout: Visual Store: Illico pole, profile one (www.visualstore.com) Dec. 21, 2003, 3 pages.
Website printout:, CafeProducts.com Food Shields-Sneeze Guards. The Safari Adapts Food Shields, Aug. 16, 2003, 1 page.

FOOD SERVICE EQUIPMENT AND SYSTEMS

CROSS REFERENCE TO RELATED APPLICATION

This application is a divisional application of U.S. patent application Ser. No. 13/920,915, filed on Jun. 18, 2013, by Atkins et al. and titled, "FOOD SERVICE EQUIPMENT AND SYSTEMS" which is hereby incorporated by reference in its entirety.

BACKGROUND

Food shields, sometimes referred to as sneeze guards, may be used in a variety of settings. For example, a panel may be suspended over a buffet, smorgasbord, salad bar, retail display, or other type of food display, to protect the food from falling debris or other contamination. One or more panels may also be placed between the displayed food and customers, such that the customers must reach under the food shield to have access to the food, and the opportunities for contamination are limited.

SUMMARY

This Summary does not in any way limit the scope of the claimed subject matter.

In an embodiment, the invention provides food service equipment that includes a hygienic shield system having a frame that is configured to be coupled to a serving surface, and at least one clear panel that is coupled to the frame. The food service equipment may include at least one media device that is configured to play at least one media file. This media file may include audio and/or video content. The food service equipment may also include at least one controller that is configured to select the media file and to control its play using the media device.

In another embodiment, the invention provides an exemplary method for conveying information by a food service system. The method utilizes a food service system having a support that is configured to be coupled to a counter, at least one transparent sneeze guard panel operably coupled to the frame, at least one media device, and a computing device having a memory that stores at least one media file. The computer device is configured to select from its memory the media file to be played by the media device. The method may further include the step of accessing by the computing device the media file from the local memory to play audio and/or video using the media device.

In yet another embodiment, the invention provides food service equipment having a cabinet assembly that includes an internal compartment and a countertop. The food service equipment may include a sneeze guard having at least one post that is configured to be coupled to the countertop, and at least one panel coupled to the at least one post. The food service equipment may include at least one media device that is configured to play audio and/or video based on the media file. The food service equipment may further include at least one media player to select the media file to be played by the media device. The at least one media player may be mounted to the internal compartment and communicatively coupled to the at least one media device.

DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
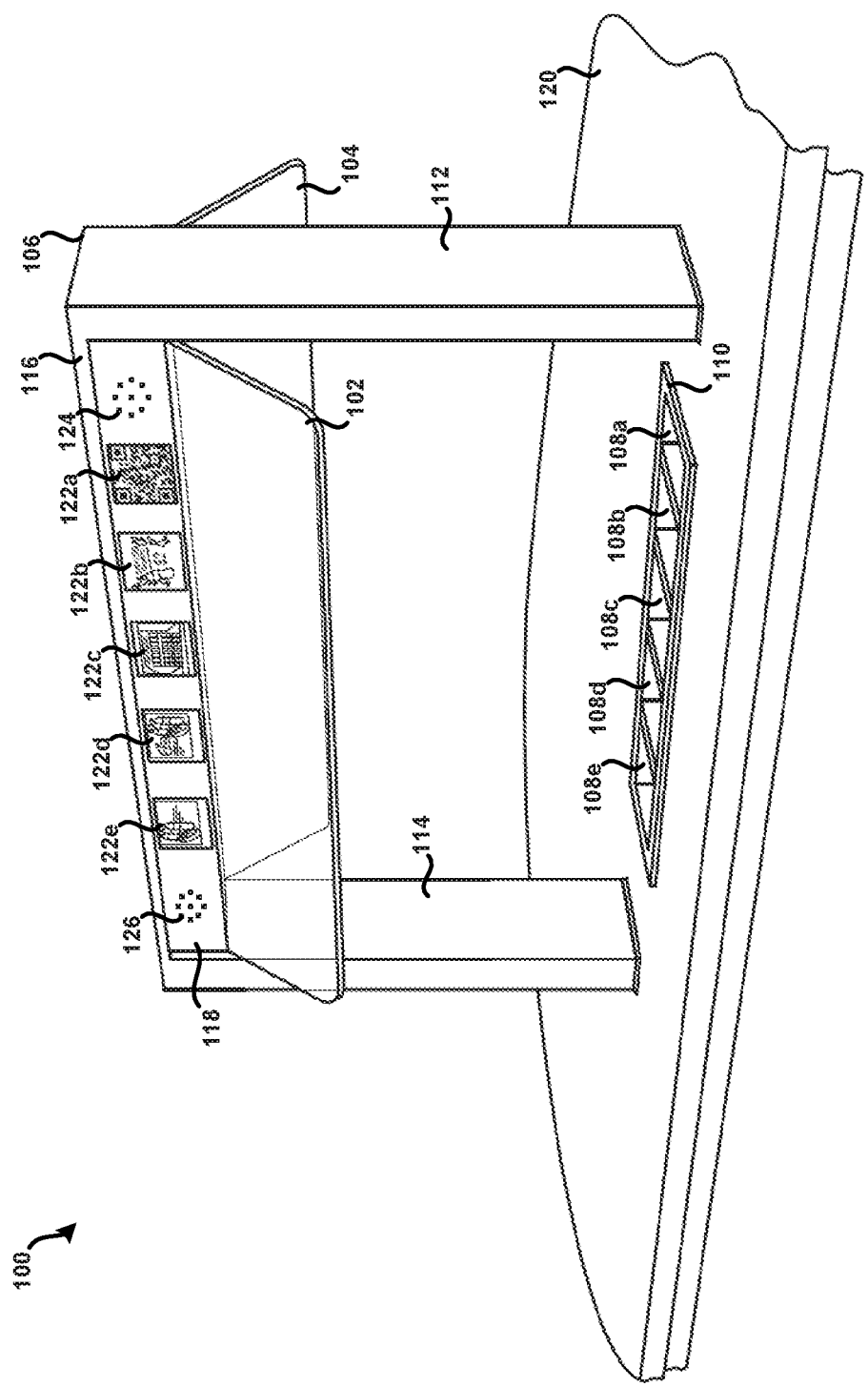
FIG. 1 shows first example serving equipment in accordance with the disclosure.

The present disclosure is generally directed to or towards conveying information to customers or individuals in a food service environment, such as, for example, while the customers are observing food that is being displayed by particular food service equipment. To do so, one or more media devices may be coupled to, incorporated within or on, or otherwise associated with the food service equipment. A controller, such as a digital media player, may also be incorporated within, coupled to, or otherwise integrated with the food service equipment to control the delivery of media content to the media devices. This may allow the customers to see or hear the media content while near the food service equipment.

The food service equipment may include serving equipment, such as a food display, beverage dispenser, heated food well, steam table, heated merchandiser, frost top, carving station, induction warmer, and many others. Additionally, the food service equipment may include any of a number of different types of components, such as one or more food shields or sneeze guards, and the like. By associating media devices with such food service equipment, a variety of information may be conveyed to individuals or customers as they observe, are served, or serve themselves items from the food service equipment.

As mentioned, a controller may be incorporated within or integrated with or on the food service equipment to control the delivery of the media content to one or more media devices. In other embodiments, the controller may be remote from the food service equipment to control the delivery of the media content to one or more media devices. In both cases, however, the controller may be communicatively coupled to the media devices to play the media content. Further, a variety of media devices may be used in order to convey information to customers. Such media devices may include, for example, an interactive or non-interactive display screen, a speaker, transparent projection screen system and many others. In general, such media devices may be incorporated within or on or integrated with the food service equipment. Other embodiments are though possible. For example, the media devices may be loosely associated with the food service equipment. In both cases, however, media content may be delivered by video, images, audio, and the like, while individuals or customers are within a general vicinity of the food service equipment.

The media content that may be provided may include any type of video content, image content, and audio content as desired, so as to convey particular information to customers or individuals in a food service environment. Additionally, such media content may be selected according to type of food service environment. For example, in a corporate cafeteria environment, the media content that may be provided may include video of recent news and events of a particular corporation, images that describe lunch specials and their prices, and audio of an authority figure congratulating employees for recent contributions during a charity drive. As another example, in a self-serve restaurant environment, the media content that may be provided may include video of various advertisements for products offered by other stores within a vicinity of the restaurant, images of a matrix barcode so that a customer may use their smartphone to quickly settle for selected items, and audio that conveys current operating hours of the restaurant. In this manner, the media content that may be provided may be in some instances selected according to type of food service environment, may include any type of one or more of video content, image content, and audio content as desired. Still further examples of media content may include, but is not limited to: advertising, food allergy information, nutrients, calories, promotions, coupons, emergency information, FDA (Food and Drug Administration) nutrition fact information, food allergen information, news, weather, and many other types or forms of media content.

Although not so limited, an appreciation of the various aspects of the present disclosure may be gained from the following discussion in connection with the drawings. In referring to the following specific embodiments, it will be appreciated that the components of the various embodiments may, in some cases, be substituted for components in other embodiments to provide a wide array of food serving equipment with associated displays.

For example, FIG. 1 shows a first example serving equipment 100 in accordance with the present disclosure. In this example, the first equipment 100 is shown to include a first panel 102 and a second panel 104 both rigidly coupled to a frame 106. One or both of the first panel 102 and the second panel 104 may be formed from or of a clear or transparent material such as glass, acrylic, polycarbonate, and other clear or transparent materials. In general, the first panel 102 and the second panel 104 may each be referred to as a "sneeze guard," or a "food shield," and the like. This is because the first panel 102 and the second panel 104 may protect food or other items within a number of containers 108a-e of a tray 110 from debris or other contamination that may be deposited as individuals visit the first equipment 100 to view or otherwise access items within the containers 108a-e. Other embodiments of the first panel 102 and the second panel 104 are possible. For example, it is contemplated that one or both of the first panel 102 and the second panel 104 may be formed from or of an opaque or translucent material. In this manner, the first panel 102 and the second panel 104 may be formed from or of any material as desired, and further such material may be chosen based on intended application.

The frame 106 may include a first post 112 and a second post 114 connected together by a beam 116. In general, a media module 118 may be coupled to the frame 106, and may be configured and arranged to convey particular information to customers or individuals in vicinity of the first equipment 100, discussed further below. In this example, the first post 112 and the second post 114 may be rigidly coupled to a surface 120 of the first equipment 100, and the first post 112, the second post 114, and the beam 116 may be formed from or of a material of sufficient strength so as to support the first panel 102, the second panel 104, and the media module 118. For example, the frame 106 may formed of or from a metal, such as steel, aluminum, brass, or metal alloy, or may be formed of or from a synthetic nonmetallic material, such as a rigid plastic. Additionally, it is contemplated that respective components of the frame 106 may generally be formed to exhibit any cross-section as desired. For example, one or both of the first post 112 and the second post 114 may have a circular cross-section, a rectangular cross-section, an irregularly shaped cross-section, and etc. In this manner, various features of structural components of the first equipment 100 may generally be selectively chosen as desired.

As mentioned above, the media module 118 may be configured and arranged to convey particular information to customers or individuals in vicinity of the first equipment 100.

For example, the media module 118 may include one or more displays 122a-e. In general, any particular one of the displays 122a-e may correspond to an output device for presentation of information in visual form, such as images and video. It is contemplated that the underlying technology of any particular one of the displays 122a-e may be selected as desired. For example, any particular one or all of the displays 122a-e may be a two-dimensional display or a three-dimensional display, such as a light-emitting diode display, a liquid crystal display, an electroluminescent display, a volumetric display, a holographic display, and many others. Further, it is contemplated that selection of the underlying technology of any particular one of the displays 122a-e may change as display technology evolves. In this manner, features of the first equipment 100 associated with conveying particular visual information may generally be selectively chosen as desired.

Additionally, or alternatively, one or more speakers may be incorporated within the media module 118. Accordingly, as shown in FIG. 1, the media module 118 may include or otherwise exhibit one or more of first audio apertures 124 and second audio apertures 126. In general, any particular one of the one or more speakers (not shown) of FIG. 1 may correspond to an output device that produces sound waves in the audible frequency range in response to an audio signal input. Although speakers are not explicitly shown in FIG. 1, it will be appreciated that such sound waves may emanate from one or both of the first audio apertures 124 and the second audio apertures 126. Further, it is contemplated that selection of the underlying technology of any particular one of the one or more speakers may change as audio technology evolves. In this manner, various features of first equipment 100 associated with conveying particular audio information may generally be selectively chosen as desired.

Such an implementation as discussed above in connection with the first equipment 100 of FIG. 1 may be beneficial or advantageous in many respects. For example, the first equipment 100 may be selectively modified based upon particular food service environment. For example, certain features of the first equipment 100 in a first food service environment may be selected to minimize cost, whereas similar features of the first equipment 100 in a more upscale second food service environment may be selected to maximize aesthetics. For example, the frame 106 of the first equipment 100 may be formed of stainless steel in an upscale restaurant implementation, as opposed to rigid plastic in a high school cafeteria implementation. In another example, the media module 118 of the first equipment 100 may exhibit one or more active-matrix liquid crystal displays in an upscale restaurant implementation, as opposed to one or more passive-matrix liquid crystal displays in a high school cafeteria implementation. In still another example, the media module 118 of the first equipment 100 may exhibit one or more high-fidelity speakers in an upscale restaurant implementation, as opposed to a high school cafeteria implementation where speakers may be omitted from the media module 118. Still other benefits or advantages are possible.

Figure 2:
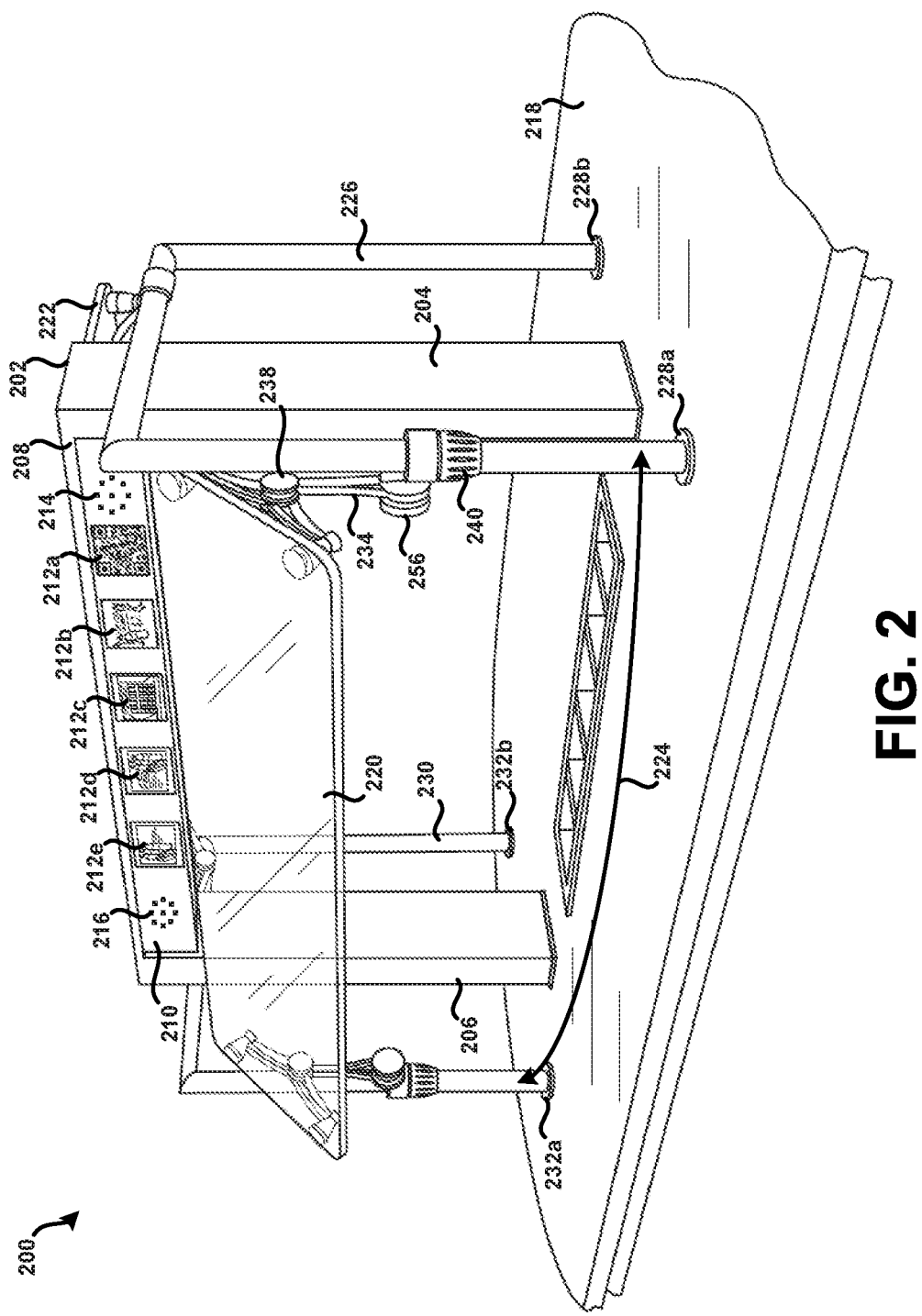
FIG. 2 shows second example serving equipment in accordance with the disclosure.

The arrangement as shown in FIG. 1 is but one example of a wide variety of food service equipment that may be constructed in accordance with the principles of the present disclosure. For example, FIG. 2 shows second example serving equipment 200 in accordance with the present disclosure. The second equipment 200 may be similar to at least the first equipment 100 of FIG. 1 in many aspects. For example, a frame 202 of the second equipment 200 may include a first post 204 and a second post 206 connected together by a beam 208. Additionally, the media module 210 may be coupled to the frame 202, and may be configured and arranged to convey particular information to customers or individuals in vicinity of the second equipment 200.

For example, the media module 210 may include one or more displays 212*a-e*, similar to displays 122*a-e* of FIG. 1, so that the second equipment 200 may be configured and arranged to convey particular visual information to individuals in vicinity of the second equipment 200. Additionally, or alternatively, one or more speakers may be incorporated within the media module 210. Accordingly, as shown in FIG. 2, the media module 210 may include or otherwise exhibit one or more of first audio apertures 214 and second audio apertures 216, so that the second equipment 200 may be configured and arranged to convey particular audio information to individuals in vicinity of the second equipment 200. Further, the first post 204 and the second post 206 may both be rigidly coupled to a surface 218 of the second equipment 200, and the first post 204, the second post 206, and the beam 208 may be formed from or of a material of sufficient strength so as to support the media module 210.

The second equipment 200 may further include a first panel 220 and a second panel 222. In FIG. 2 however, in comparison to FIG. 1 for example, the first panel 220 is adjustably coupled to a support assembly 224, while the second panel 222 is rigidly coupled to the support assembly 224. In general, the support assembly 224 may be formed of a first support 226 rigidly coupled to the surface 218 by first support ends 228*a-b*, and a second support 230 rigidly to the surface 218 by second support ends 232*a-b*. The second panel 222 may be rigidly coupled to the support assembly 224 so as to provide a surface to place items, for example, while the first panel 220 may be adjustably coupled to the support assembly 224 so as to provide for three-way or three-axis adjustment of the first panel 220. In general, independent three-axis adjustment of the first panel 220 may be enabled by an articulating arm 234 that includes a first pivot 236 and a second pivot 238, where the articulating arm 234 is coupled to a sleeve bushing 240 by the first pivot 236. An example of such an assembly and its functionality is described in U.S. patent application Ser. No. 13/848,843, filed 22 Mar. 2013, and entitled ADJUSTABLE FOOD SHIELD, the entirety of which is hereby incorporated by reference for all intents and purposes.

Such an implementation as discussed above in connection with the second equipment 200 of FIG. 2 may be beneficial or advantageous in many respects. For example, certain features of the second equipment 200 may be selectively chosen based upon particular food service environment, similar to the first equipment 100 discussed above in connection with FIG. 1. Further, independent three-axis adjustment of the first panel 220 as enabled by at least the articulating arm 234 and the sleeve bushing 240 may allow for easy access to food and cleaning of the second equipment 200, and also allow for easy compliance with any code or regulation. Still other benefits or advantages are possible.

Still other food service equipment may be constructed in accordance with the principles of the present disclosure. For example, referring now to FIG. 3, a third example serving equipment 300 is shown. The third equipment 300 may be similar to at least the second equipment 200 of FIG. 2 in many aspects. For example, a frame 302 of the third equipment 300 may include a first post 304 and a second post 306 connected together by a beam 308. The third equipment 300 may further include a first panel 310 and a second panel 312, where the first panel 310 is adjustably coupled to a support assembly 314, while the second panel 312 is rigidly coupled to the support assembly 314. The support assembly 314 may be formed of a first support 316 rigidly coupled to a surface 318 by first support ends 320*a-b*, and a second support 322 rigidly to the surface 318 by second support ends 324*a-b*. The second panel 312 may be rigidly coupled to the support assembly 314, while the first panel 310 may be adjustably coupled to the support assembly 314 so as to provide for three-way or three-axis adjustment of the first panel 310. Independent three-axis adjustment of the first panel 310 may be enabled by an articulating arm 326 that includes a first pivot 328 and a second pivot 330, where the articulating arm 326 is coupled to a sleeve bushing 332 by the first pivot 328.

The third equipment 300 may further include one or more aspects of a media module similar to the media module 210 of FIG. 2. Some media module aspects as depicted in FIG. 3 though are different than aspects of the media module 210 of FIG. 2.

For example, one or more displays 334*a-e* may be incorporated or integrated on or within the first panel 310 of the third equipment 300. In general, any particular one of the displays 334*a-e* may correspond to an output device for presentation of information in visual form, such as images and video. It is contemplated that the underlying technology of any particular one of the displays 334*a-e* may be selected as desired. For example, any particular one or all of the displays 334*a-e* may be a two-dimensional display or a three-dimensional display, such as a photovoltaic glass technology display, a light-emitting diode display, a liquid crystal display, a holographic display, and many others. Further, it is contemplated that selection of the underlying technology of any particular one of the displays 334*a-e* may change as display technology evolves. In this manner, various features of third equipment 300 associated with conveying particular visual information may generally be selectively chosen as desired.

Additionally, or alternatively, one or more speakers may be incorporated within the third equipment 300. Accordingly, as shown in FIG. 3, the first post 304 and the second post 306 of the frame 302 may include or otherwise exhibit, respectively, first audio apertures 336 and second audio apertures 338. In general, any particular one of the one or more speakers (not shown) of FIG. 3 may correspond to an output device that produces sound waves, in the audible frequency range, in response to an audio signal input. Although speakers are not explicitly shown in FIG. 3, it will be appreciated that such sound waves may emanate from one or both of the first audio apertures 336 and the second audio apertures 338. Further, it is contemplated that selection of the underlying technology of any particular one of speakers may change as audio technology evolves. In this manner, various features of the third equipment 300 associated with conveying particular audio information may generally be selectively chosen as desired.

Figure 3:
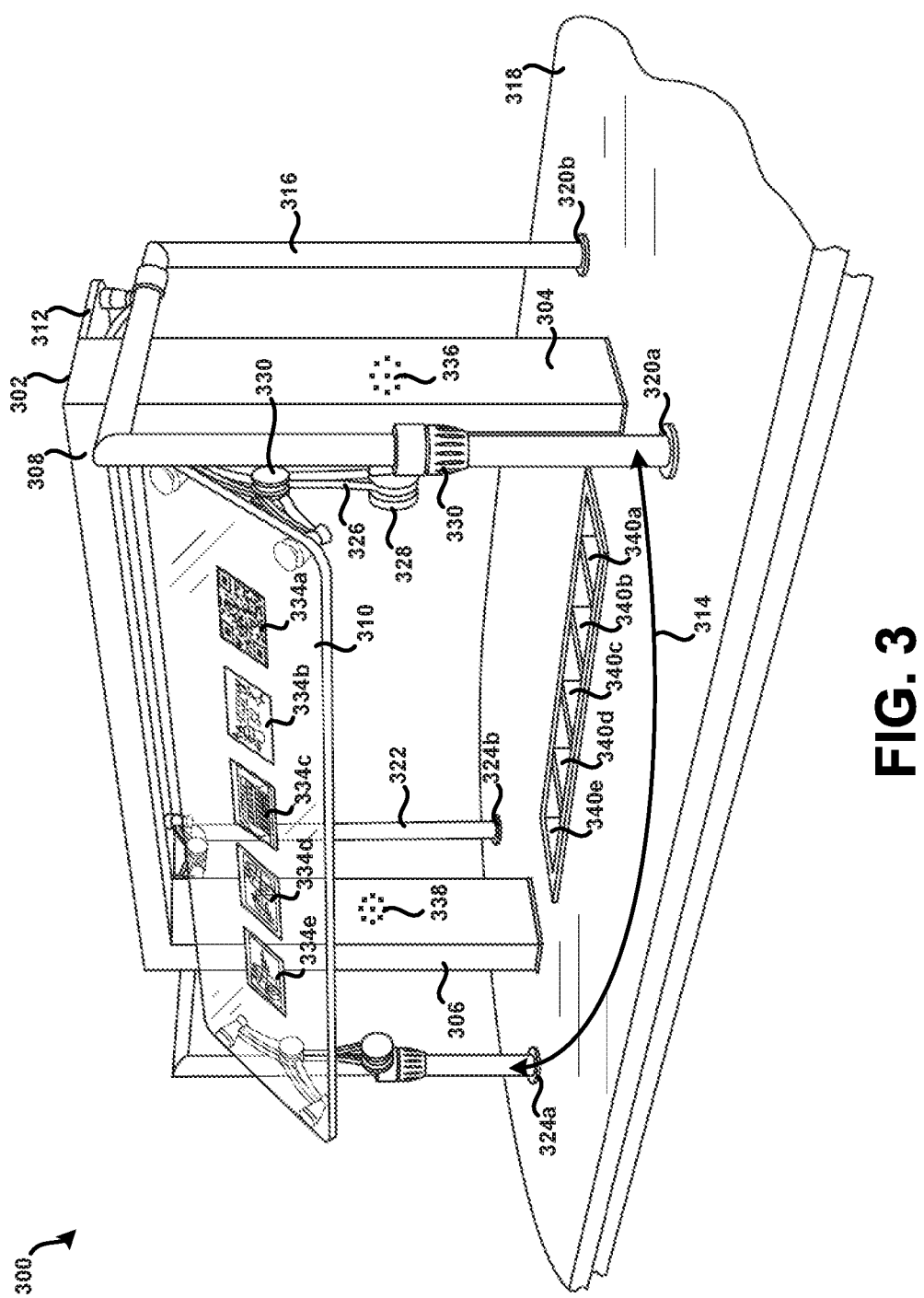
FIG. 3 shows third example serving equipment in accordance with the disclosure.

Such an implementation as discussed above in connection with the third equipment 300 of FIG. 3 may be beneficial or advantageous in many respects. For example, certain features of the third equipment 300 may be selectively chosen based upon particular food service environment, similar to the first equipment 100 discussed above in connection with FIG. 1. Further, independent three-axis adjustment of the first panel 310 enabled at least by the articulating arm 326 and the sleeve bushing 332 may allow for easy access to food, cleaning of third equipment 300, and compliance with any code or regulation, similar to the second equipment 200 discussed above in connection with FIG. 2. Still further, incorporation or integration of one or more of displays 334a-e within or on the first panel 310 of the third equipment 300 may more effectively direct attention to messages, such as advertisements, to individuals or customers as they view or otherwise access items within a number of containers 340a-e incorporated within the surface 318. Still other benefits or advantages are possible.

Still other food service equipment may be constructed in accordance with the principles of the present disclosure. For example, referring now to FIG. 4, a fourth example serving equipment 400 is shown. The fourth equipment 400 may be similar to at least the second equipment 200 of FIG. 2 in many aspects. For example, the fourth equipment 400 may include a first panel 402 and a second panel 404, where the first panel 402 is adjustably coupled to a support assembly 406, while the second panel 404 is rigidly coupled to the support assembly 406. In general, the support assembly 406 may be formed of a first support 408 rigidly coupled to a surface 410 by first support ends 412a-b, and a second support 414 rigidly to the surface 410 by second support ends 416a-b. The second panel 404 may be rigidly coupled to the support assembly 406, while the first panel 402 may be adjustably coupled to the support assembly 406 so as to provide for three-way or three-axis adjustment of the first panel 402. Independent three-axis adjustment of the first panel 402 may be enabled by an articulating arm 418 that includes a first pivot 420 and a second pivot 422, where the articulating arm 418 is coupled to a sleeve bushing 424 by a first pivot 420.

Figure 4:
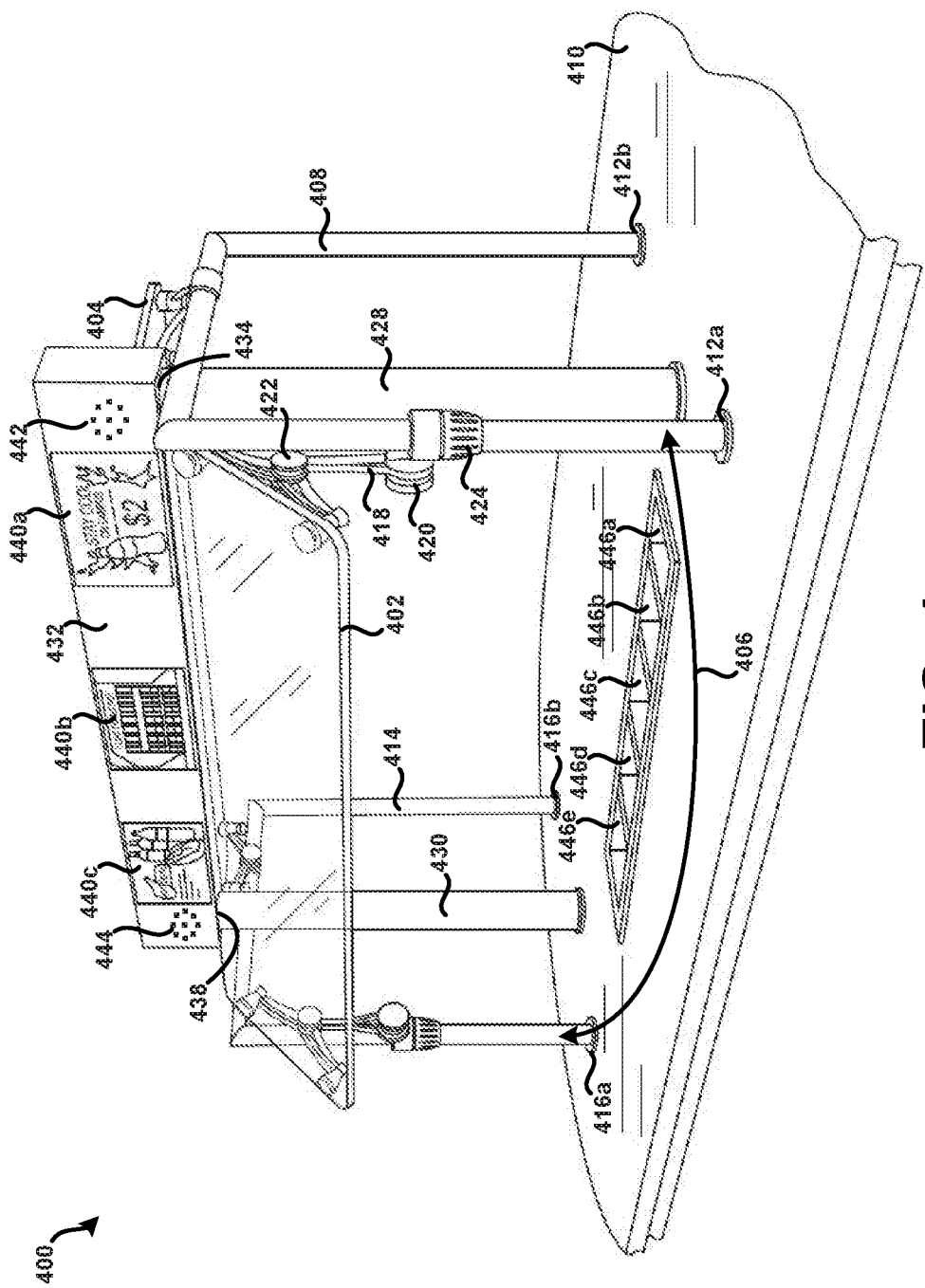
FIG. 4 shows fourth example serving equipment in accordance with the disclosure.

The fourth equipment 400 may further include one or more aspects of a media module similar to media module 210 of FIG. 2. Some media module aspects as depicted in FIG. 4 are though different than aspects of the media module 210 of FIG. 2. This is because a frame of the fourth equipment 400 may include a first post 428 and a second post 430, where a media module 432 is mounted to an end 434 of the first post 428 and also to an end 438 of the second post 430. However, similar to media module 210 of FIG. 2, the media module 432 may be configured and arranged to convey particular information to customers or individuals in vicinity of the fourth equipment 400.

For example, the media module 432 may include one or more displays 440a-c, similar to the displays 212a-e of FIG. 2, so that the fourth equipment 400 may be configured and arranged to convey particular visual information to individuals in vicinity of the fourth equipment 400. Additionally, or alternatively, one or more speakers may be incorporated within the media module 432. Accordingly, as shown in FIG. 4, the media module 432 may include or otherwise exhibit one or more of first audio apertures 442 and second audio apertures 444, so that the fourth equipment 400 may be configured and arranged to convey particular audio information to individuals in vicinity of the fourth equipment 400. Further, the first post 428 and the second post 430 may both be rigidly coupled to the surface 410 of the fourth equipment 400, and the first post 428 and the second post 430 may be formed from or of a material of sufficient strength so as to support the media module 432.

Such an implementation as discussed above in connection with the fourth equipment 400 of FIG. 4 may be beneficial or advantageous in many respects. For example, certain features of the fourth equipment 400 may be selectively chosen based upon particular food service environment, similar to the first equipment 100 discussed above in connection with FIG. 1. Further, independent three-axis adjustment of the first panel 402 enabled at least by the articulating arm 418 and the sleeve bushing 424 may allow for easy access to food, cleaning of the fourth equipment 400, and compliance with any code or regulation, similar to the second equipment 200 discussed above in connection with FIG. 2. Still further, mounting of the media module 432 to both the end 434 of the first post 436 and the end 438 of the second post 430 may more prominently direct attention to messages, such as advertisements, to both individuals or customers as they view or otherwise access items within a number of containers 446a-e incorporated within the surface 410, and also to individuals or customers within a general vicinity of the fourth equipment 400. Still other benefits or advantages are possible.

Still other food service equipment may be constructed in accordance with the principles of the present disclosure. For example, referring now to FIG. 5, a fifth example serving equipment 500 is shown. The fifth equipment 500 may at least be similar to the second equipment 200 of FIG. 2 in many aspects. For example, a frame 502 of the fifth equipment 500 may include a first post 504 and a second post 506 connected together by a beam 508. The fifth equipment 500 may further include a first panel 510 and a second panel 512, where the first panel 310 is adjustably coupled to a support assembly 514, while the second panel 512 is rigidly coupled to the support assembly 514. The support assembly 514 may be formed of a first support 516 rigidly coupled to a surface 518 by first support ends 520a-b, and a second support 522 rigidly to the surface 518 by second support ends 524a-b. The second panel 512 may be rigidly coupled to the support assembly 514, while first panel 510 may be adjustably coupled to the support assembly 514 so as to provide for three-way or three-axis adjustment of the first panel 510. Independent three-axis adjustment of the first panel 510 may be enabled by an articulating arm 526 that includes a first pivot 528 and a second pivot 530, where the articulating arm 526 is coupled to a sleeve bushing 532 by the first pivot 528.

The fifth equipment 500 may further include one or more aspects of a media module similar to the media module 210 of FIG. 2. Some media module aspects as depicted in FIG. 5 are though different than aspects of the media module 210 of FIG. 2.

For example, a media module 534 may be mounted to the surface 518 and may include one or more displays 536*a-e*, similar to the displays 212*a-e* of FIG. 2, incorporated or integrated on or within the media module 534 on a first face 538, so that the fifth equipment 500 may be configured and arranged to convey particular visual information to individuals in vicinity of the fifth equipment 500. Further, although not shown in FIG. 5, the media module 534 may include one or more additional displays incorporated or integrated on or within the media module 534 on a second face 540 opposite of the first face 538. Additionally, or alternatively, one or more speakers may be incorporated within the fifth equipment 500. Accordingly, as shown in FIG. 5, the first post 504 and the second post 506 of the frame 502 may include or otherwise exhibit, respectively, first audio apertures 542 and second audio apertures 544, so that the fifth equipment 500 may be configured and arranged to convey particular audio information to individuals in vicinity of the fifth equipment 500.

Figure 5:
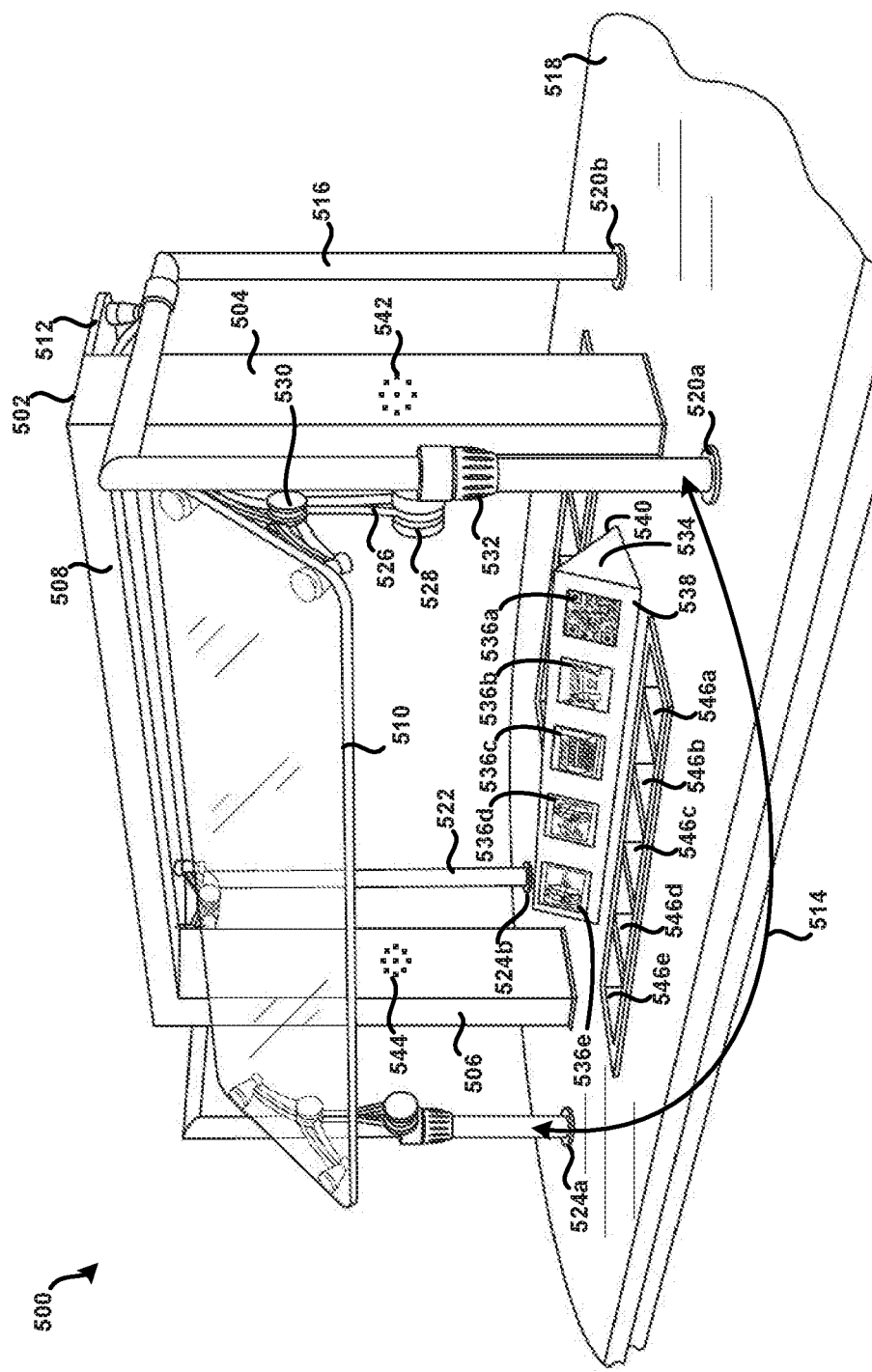
FIG. 5 shows fifth example serving equipment in accordance with the disclosure.

Such an implementation as discussed above in connection with the fifth equipment 500 of FIG. 5 may be beneficial or advantageous in many respects. For example, certain features of the fifth equipment 500 may be selectively chosen based upon particular food service environment, similar to the first equipment 100 discussed above in connection with FIG. 1. Further, independent three-axis adjustment of the first panel 510 enabled at least by the articulating arm 526 and the sleeve bushing 532 may allow for easy access to food, cleaning of fifth equipment 500, and compliance with any code or regulation, similar to the second equipment 200 discussed above in connection with FIG. 2. Still further, mounting of the media module 534 to the surface 518 of the fifth equipment 500 may more effectively direct attention to messages, such as advertisements, to individuals or customers as they view or otherwise access items within a number of containers 546*a-e* incorporated within the surface 518. Still other benefits or advantages are possible.

Still other food service equipment may be constructed in accordance with the principles of the present disclosure. For example, referring now to FIG. 6, a sixth example serving equipment 600 is shown. The sixth equipment 600 may be similar to at least the fifth equipment 500 of FIG. 5 in many aspects. For example, the sixth equipment 600 may include a first panel 602 and a second panel 604, where the first panel 602 is adjustably coupled to a support assembly 606, while the second panel 604 is rigidly coupled to the support assembly 606. The support assembly 606 may be formed of a first support 608 rigidly coupled to a surface 610 by a first support end 612, and a second support 614 rigidly to the surface 610 by second support ends 616*a-b*. The first panel 602 may be adjustably coupled to the support assembly 606 so as to provide for three-way or three-axis adjustment of the first panel 602. Independent three-axis adjustment of the first panel 602 may be enabled by an articulating arm 618 that includes a first pivot 620 and a second pivot 622, where the articulating arm 618 is coupled to a sleeve bushing 624 by the first pivot 620.

Figure 6:
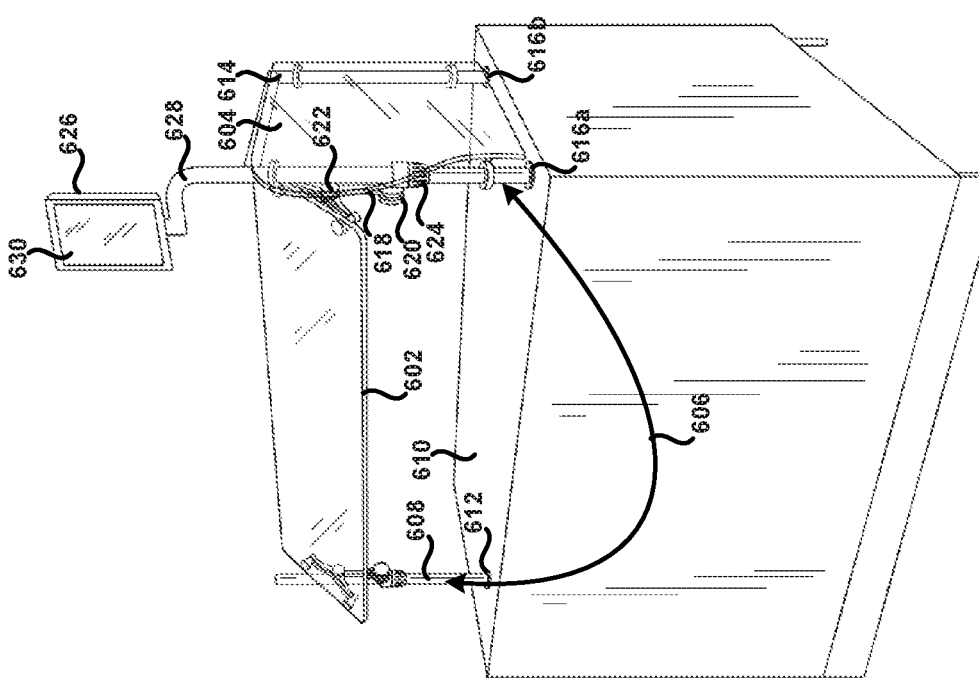
FIG. 6 shows sixth example serving equipment in accordance with the disclosure.

The sixth equipment 600 may further include one or more aspects of a media module similar to the media module 534 of FIG. 5. Some media module aspects as depicted in FIG. 6 are different than aspects of the media module 534 of FIG. 5. For example, a media module 626 may be mounted to a post 628 that is coupled to the second support 614, and may include at least one display 630, similar to the displays 536*a-e* of FIG. 5, incorporated or integrated on or within the media module 626 so that the sixth equipment 600 may be configured and arranged to convey particular visual information to individuals in the vicinity of the sixth equipment 600. Further, although not shown in FIG. 6, one or more speakers may be incorporated within the sixth equipment 600 in a manner similar to that described above so that the sixth equipment 600 may be configured and arranged to convey particular audio information to individuals in vicinity of the sixth equipment 600.

Such an implementation as discussed above in connection with the sixth equipment 600 of FIG. 6 may be beneficial or advantageous in many respects. For example, certain features of the sixth equipment 600 may be selectively chosen based upon the particular food service environment, similar to the first equipment 100 discussed above in connection with FIG. 1. Further, independent three-axis adjustment of the first panel 602 may allow for easy access to food, cleaning of the sixth equipment 600, and compliance with any code or regulation, similar to the second equipment 200 discussed above in connection with FIG. 2. Still further, mounting of the media module 626 to the post 628 of the sixth equipment 600 may more effectively direct attention to messages, such as advertisements or information or warnings on the food being displayed (such as highly allergic foods, such as peanuts), to individuals or customers who are not expressly viewing or otherwise accessing items provided by or on the sixth equipment 600. Still other benefits or advantages are possible.

Still other food service equipment may be constructed in accordance with the principles of the present disclosure. For example, referring now to FIG. 7, a seventh example serving equipment 700 is shown. The seventh equipment 700 may be similar to at least the first equipment 100 of FIG. 1 in many aspects. For example, a frame 702 of the seventh equipment 700 may include a first post 704 and a second post 706 connected together by a beam 708. Additionally, the media module 710 may be coupled to the frame 702, and may be configured and arranged to convey particular information to customers or individuals in vicinity of the seventh equipment 700.

Figure 7:
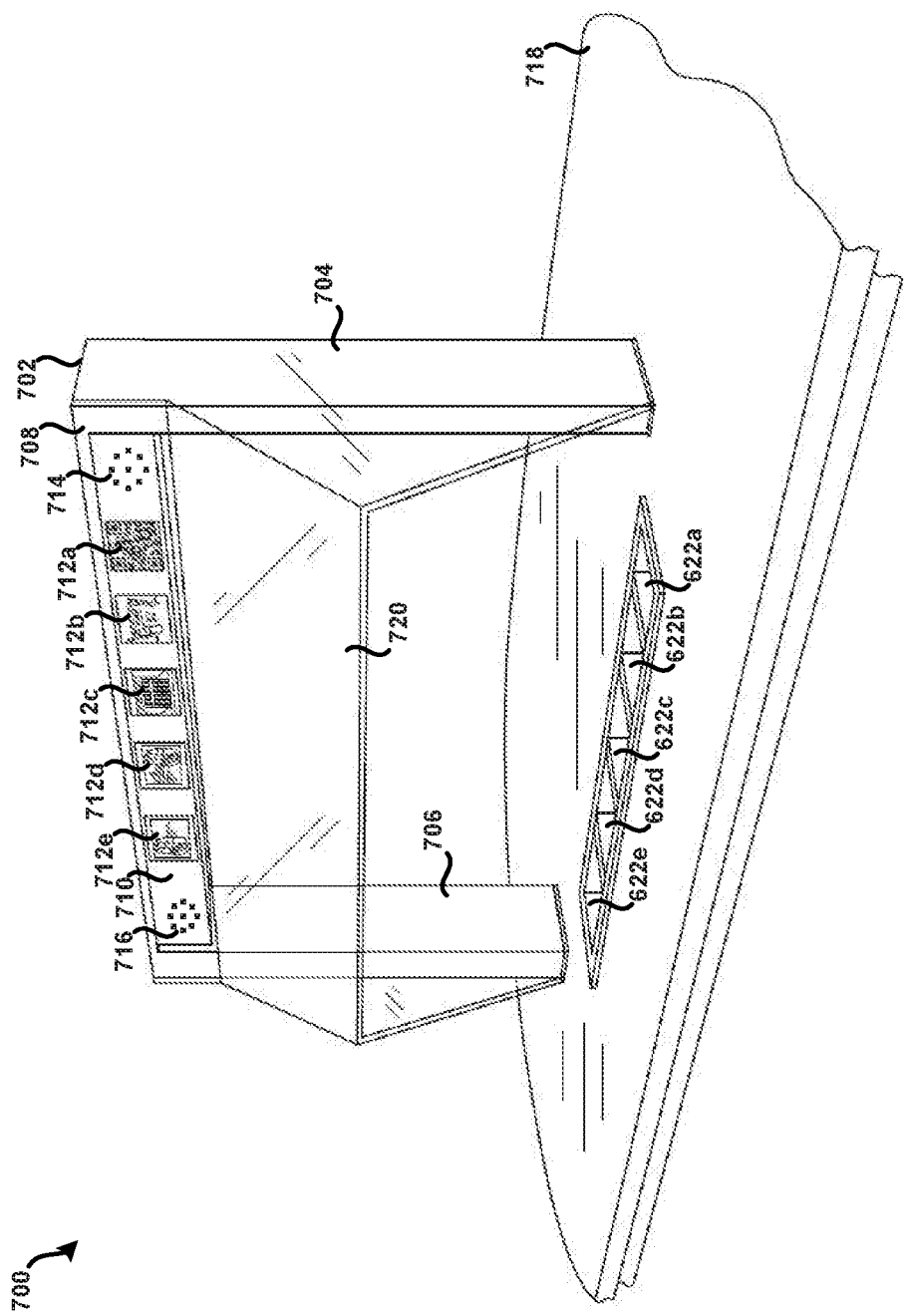
FIG. 7 shows seventh example serving equipment in accordance with the disclosure.

For example, the media module 710 may include one or more displays 712*a-e*, similar to the displays 122*a-e* of FIG. 1, so that the seventh equipment 700 may be configured and arranged to convey particular visual information to individuals in vicinity of the seventh equipment 700. Additionally, or alternatively, one or more speakers may be incorporated within the media module 710. Accordingly, as shown in FIG. 7, the media module 710 may include or otherwise exhibit one or more of first audio apertures 714 and second audio apertures 716, so that the seventh equipment 700 may be configured and arranged to convey particular audio information to individuals in vicinity of the seventh equipment 700. Further, the first post 704 and the second post 706 may both be rigidly coupled to a surface 718 of the seventh equipment 700, and the first post 704, the second post 706, and the beam 708 may be formed from or of a material of sufficient strength so as to support the media module 710. The seventh equipment 700 may further include a panel 720. In FIG. 7 however, in comparison to FIG. 1 for example, the panel 720 is rigidly coupled to the frame 702 at the first post 704 and the second post 706.

Such an implementation as discussed above in connection with the seventh equipment 700 of FIG. 7 may be beneficial or advantageous in many respects. For example, certain features of the seventh equipment 700 may be selectively chosen based upon particular food service environment, similar to first equipment 100 discussed above in connection with FIG. 1. Further, arrangement of the panel 720 as shown in FIG. 7 may provide for increased protection, in comparison to the first panel 102 and the second panel 104 of FIG. 1, of food or other items within a number of containers 722a-e incorporated within the surface 718 from debris or other contamination that may be deposited as individuals visit the seventh equipment 700. Still other benefits or advantages are possible.

Figure 8:
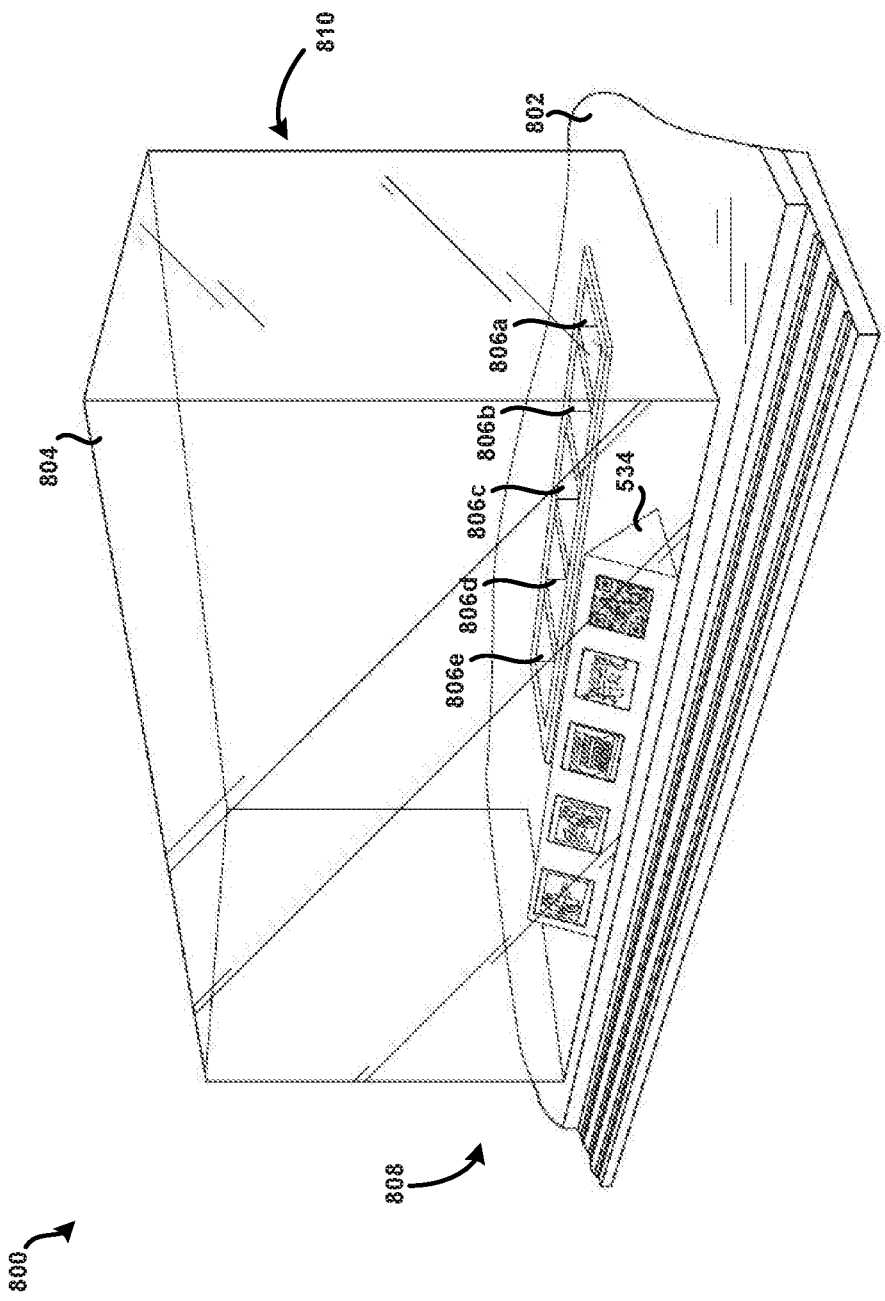
FIG. 8 shows eighth example serving equipment in accordance with the disclosure.

Still other food service equipment may be constructed in accordance with the principles of the present disclosure. For example, referring now to FIG. 8, an eighth example serving equipment 800 is shown. The eighth equipment 800 may be similar to at least the fifth equipment 500 of FIG. 5 in many aspects. For example, the media module 534 as discussed above in connection with FIG. 5 may be mounted to a surface 802 of the eighth equipment 800. Further, the eighth equipment 800 may include a panel 804. In FIG. 8 however, in comparison to FIG. 5 for example, the panel 804 is a case-like structure that may be positioned over and at least partially enclose the media module 534 and a number of containers 806a-e incorporated within the surface 802.

Such an implementation as discussed above in connection with the eighth equipment 800 of FIG. 8 may be beneficial or advantageous in many respects. For example, certain features of the eighth equipment 800 may be selectively chosen based upon particular food service environment, similar to the first equipment 100 discussed above in connection with FIG. 1. Further, arrangement of the panel 804 as shown in FIG. 8 may provide for increased protection, in comparison to the first panel 102 and the second panel 104 of FIG. 1, of food or other items within a number of containers 806a-e incorporated within the surface 802 from debris or other contamination that may be deposited as individuals visit the eighth equipment 800. For example, the panel 804 may at least protect food or other items within the containers 806a-e from debris or other contamination that may be deposited by individuals as they pass by on a first side 808 of the eighth equipment 800, and also allow access to items within the containers 806a-e from a second side 810 opposite the first side 808. Still other benefits or advantages are possible.

Figure 9:
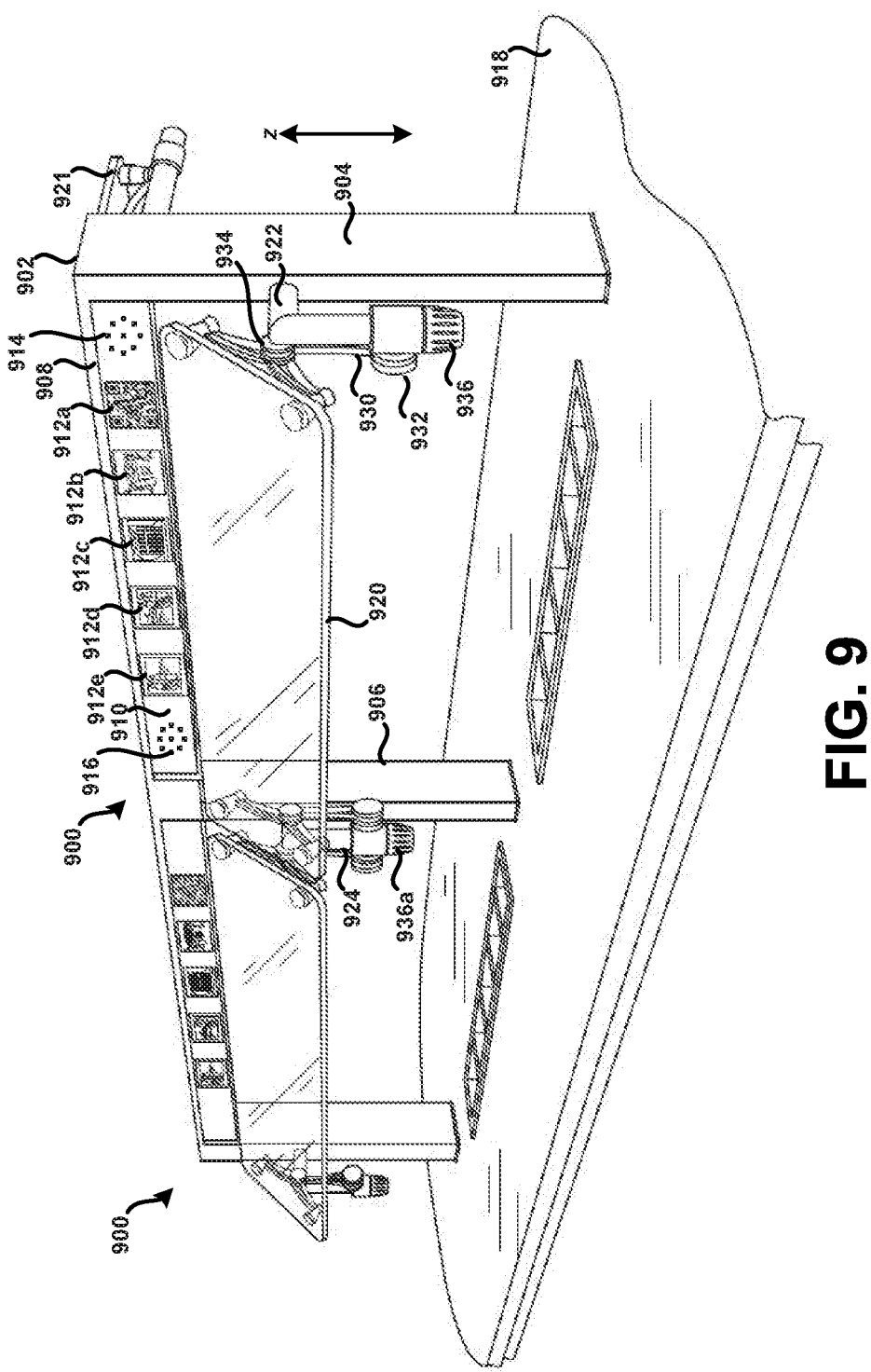
FIG. 9 shows ninth example serving equipment in accordance with the disclosure.

Still other food service equipment may be constructed in accordance with the principles of the present disclosure. For example, referring now to FIG. 9, an ninth example serving equipment 900 is shown. In particular, FIG. 9 shows multiple instances of the ninth equipment 900 adjacently arranged. It is contemplated that multiple instances of any of the serving equipment of the present disclosure may be adjacently arranged similar to that of the ninth equipment 900 as shown in FIG. 9, and that such an implementation may be applicable to many different food service environments.

The ninth equipment 900 may be similar to at least the second equipment 200 of FIG. 2 in many aspects. For example, a frame 902 of the ninth equipment 900 may include a first post 904 and a second post 906 connected together by a beam 908. Additionally, a media module 910 may be coupled to the frame 902, and may be configured and arranged to convey particular information to customers or individuals in vicinity of the ninth equipment 900. For example, the media module 910 may include one or more displays 912a-e, similar to displays 212a-e of FIG. 2, so that the ninth equipment 900 may be configured and arranged to convey particular visual information to individuals in vicinity of the ninth equipment 900. Additionally, or alternatively, one or more speakers may be incorporated within the media module 910. Accordingly, as shown in FIG. 9, the media module 910 may include or otherwise exhibit one or more of first audio apertures 914 and second audio apertures 916, so that the ninth equipment 900 may be configured and arranged to convey particular audio information to individuals in vicinity of the ninth equipment 900. Further, the first post 904 and the second post 906 may both be rigidly coupled to a surface 918 of the ninth equipment 900, and the first post 904, the second post 906, and the beam 908 may be formed from or of a material of sufficient strength so as to support the media module 910.

Figure 10:
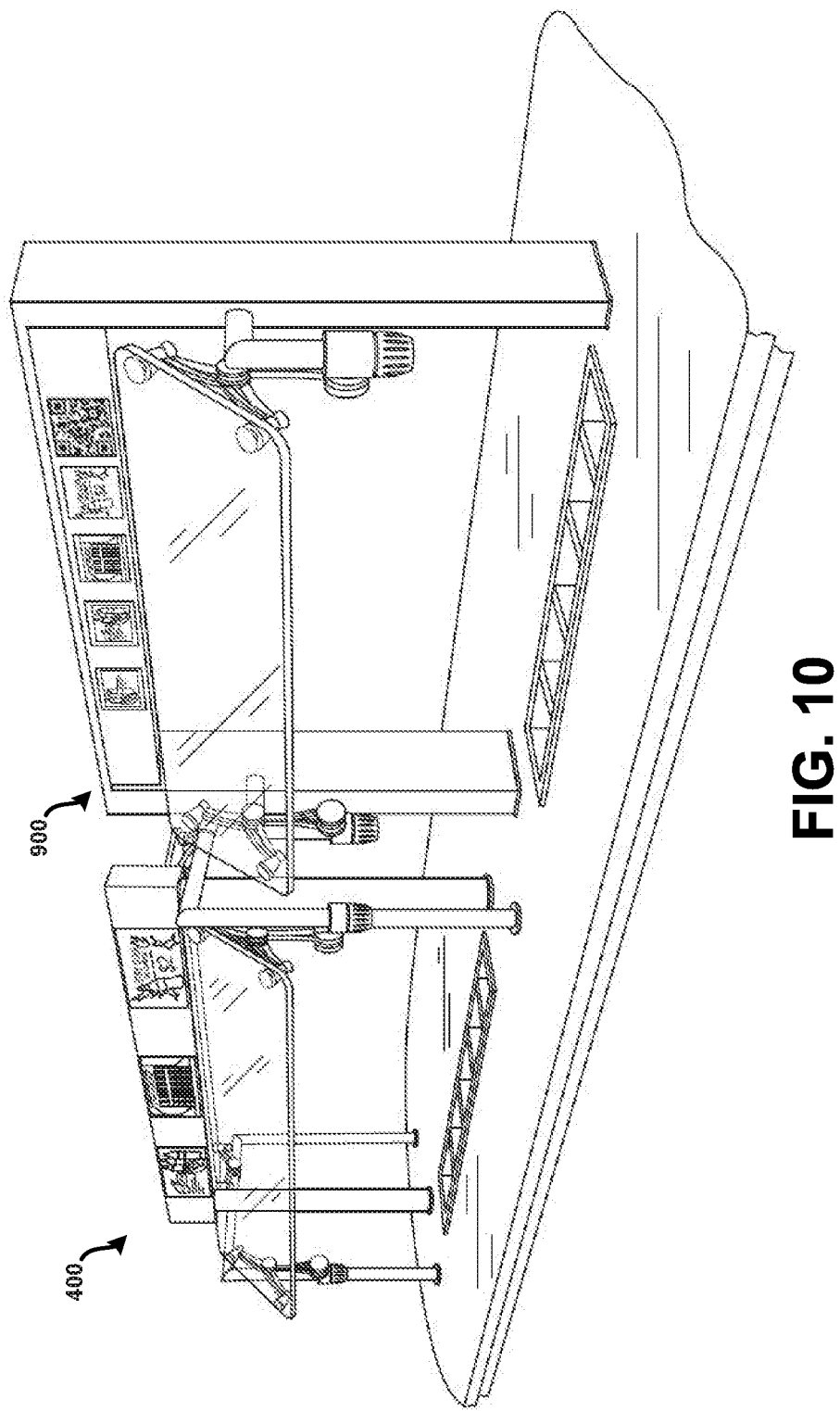
FIG. 10 shows the serving equipment of FIG. 4 and FIG. 9 adjacently arranged.

The ninth equipment 900 may further include first panel 920 and a second panel 821. In FIG. 9 however, in comparison to FIG. 2 for example, the first panel 920 is adjustably coupled to a first support 922 that is rigidly coupled to the first post 904, and a second support 924 that is rigidly coupled to the second post 906. The first panel 920 may be adjustably coupled to the first support 922 and the second support 924 so as to provide for three-way or three-axis adjustment of the first panel 920. In general, independent three-axis adjustment of the first panel 920 may be enabled by an articulating arm 930 that includes a first pivot 932 and a second pivot 934, where the articulating arm 930 is coupled to a sleeve bushing 936 by the first pivot 932. However, in the example shown, the first panel 920 of both instances of the ninth equipment 900 may be adjusted in the z-direction to a similar position because the first panel 920 of both instances of the ninth equipment 900 are connected to the same sleeve bushing 936a. Other embodiments are possible. For example, while FIG. 9 shows multiple instances of the ninth equipment 900 adjacently arranged and connected together, it is contemplated that one or more particular instances of different types of serving equipment consistent with the present disclosure may also be adjacently arranged in a disconnected configuration. For example, FIG. 10 shows the serving equipment of FIG. 4 and FIG. 9 adjacently arranged in a disconnected configuration. Still other embodiments are possible as well.

Figure 11:
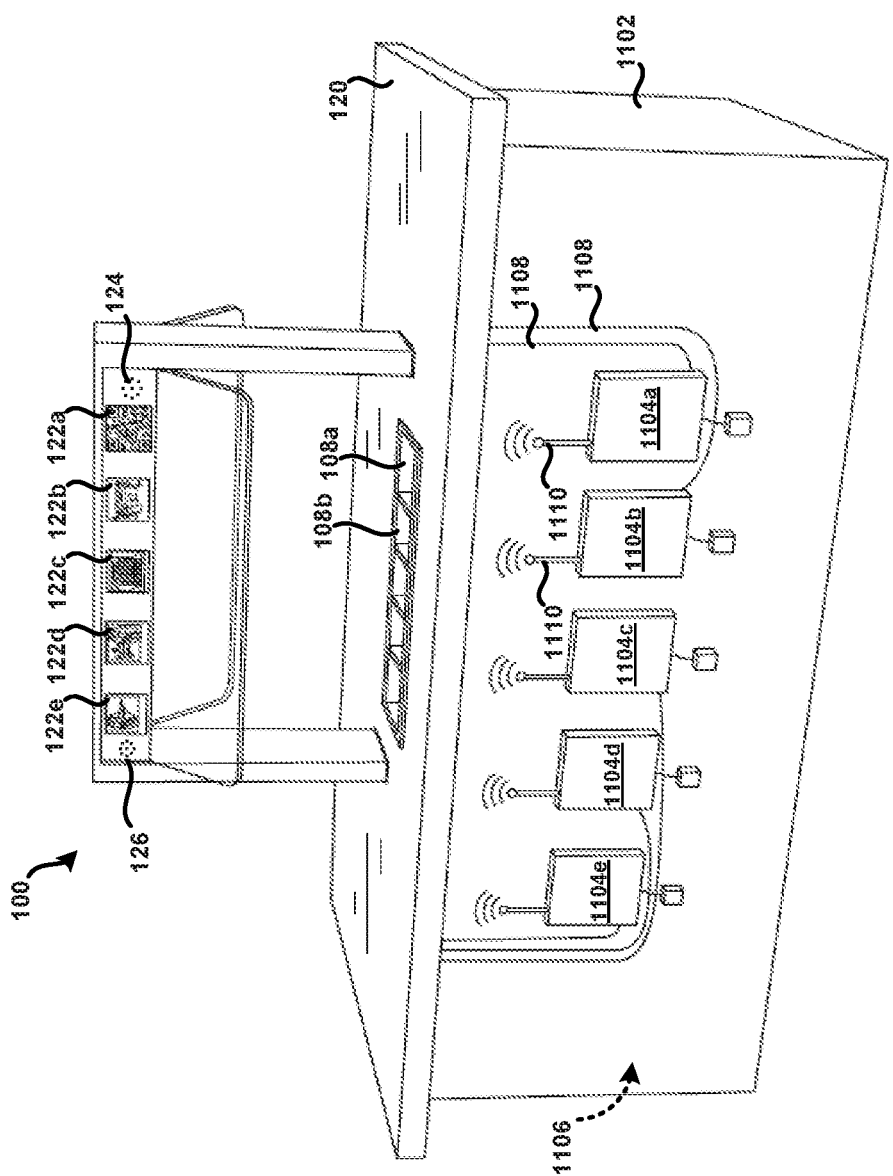
FIG. 11 shows the serving equipment of FIG. 1 in further detail.

Referring now to FIG. 11, aspects of the first equipment 100 of FIG. 1 are shown in further detail. In particular, the surface 120 of the first equipment 100 is shown coupled to a cabinet 1102, and one or more controllers 1104a-e are shown mounted to an internal compartment 1106 of the cabinet 1102. As discussed further below, the one or more controllers 1104a-e may enable the first equipment 100 to convey particular information to customers or individuals in a food service environment. It is contemplated though that the following description is also applicable to at least the food service equipment described above in connection with FIGS. 2-10.

In an aspect, any of one or more of the controllers 1104a-e may be configured and arranged to generate at least one video signal so that particular visual information may be output by any particular one of the displays 122a-e of the first equipment 100. For example, the controller 1104a may be configured and arranged to generate at least one video signal that may be transmitted via one of a hardwired connection 1108 and a wireless connection 1110 to the display 122a, so that an image or a video may be output by the display 122a. Similarly, the controllers 1104b-e may be configured and arranged to generate at least one video signal that may be transmitted via one of a hardwired connection 1108 and a wireless connection 1110 to a corresponding one of displays 122*b-e*, so that a particular image or a video may be output by the displays 122*b-e*. In these examples, each one of the displays 122*a-e* is associated with a dedicated one of the controllers 1104*a-e*. Other embodiments are however possible. In general, it is contemplated that any particular image or a video as desired may be output for display by any particular one of the displays 122*a-e*. For example, various information associated with food positioned in container 108*a* may be output for display by display 122*a*, various information associated with food positioned in container 108*b* may be output for display by display 122*b*, and etc. However, many other embodiments are possible as discussed throughout.

In another aspect, any of one or more of the controllers 1104*a-e* may be configured and arranged to generate at least one audio signal so that particular audio information may be output via any particular one of the first audio apertures 124 and the second audio apertures 126 of the first equipment 100. For example, the controller 1104*a* may be configured and arranged to generate at least one audio signal that may be transmitted via one of a hardwired connection 1108 and a wireless connection 1110 to a particular speaker (not shown) integrated with the first equipment 100, so that particular audio may be output via first audio apertures 124. Similarly, one or more of the controllers 1104*b-e* may be configured and arranged to generate at least one audio signal that may be transmitted via one of a hardwired connection 1108 and a wireless connection 1110 to another particular speaker(s) integrated with the first equipment 100, so that particular audio may be output via second audio apertures 126. In these examples, any of particular one of the controllers 1104*a-e* may generally be associated with a particular speaker so that particular audio may be output via the first audio apertures 124 and second audio apertures 126 as desired. Other embodiments are however possible.

It is contemplated that the underlying technology of any particular one of the controllers 1104*a-e* may be selected as desired. For example, any particular one or all of controllers 1104*a-e* may correspond to a digital media player. In general, a digital media player may comprise of a device that is capable of storing and playing digital media such as audio, images, video, documents, and etc. However, selection of the underlying technology of any particular one of the controllers 1104*a-e* may change, or perhaps one or more of the controllers 1104*a-e* be omitted, as technology evolves. For example, in some embodiments, functionality implemented by the controllers 1104*a-e* may be incorporated or integrated into or with the displays 122*a-e* or speakers of the first equipment 100. In such an implementation, the controllers 1104*a-e* may be omitted from the first equipment 100. Still other embodiments are possible. For example, any of the serving equipment of the present disclosure may be equipped to include a liquid crystal display with integrated media player and wireless local area network (e.g., WiFi) capability, transparent projection screen system (e.g., "on panel") capability, multi-output media player (e.g., a single box with multiple video outputs) capability, and etc. Still many other embodiments are possible.

For example, it is contemplated that a motion sensor may be incorporated within or on any of the serving equipment of the present disclosure, and/or one or more features or elements of any of the serving equipment of the present disclosure (e.g., within or on a liquid crystal display), that may be utilized to switch "on" one or more of an audio and video display when someone approaches the serving equipment and switch "off" one or more of an audio and video display following a "time-out" when nobody is around. It is also contemplated that a projection system may be used to project images directly on a panel of a serving equipment. Still other embodiments are possible.

Figure 12:
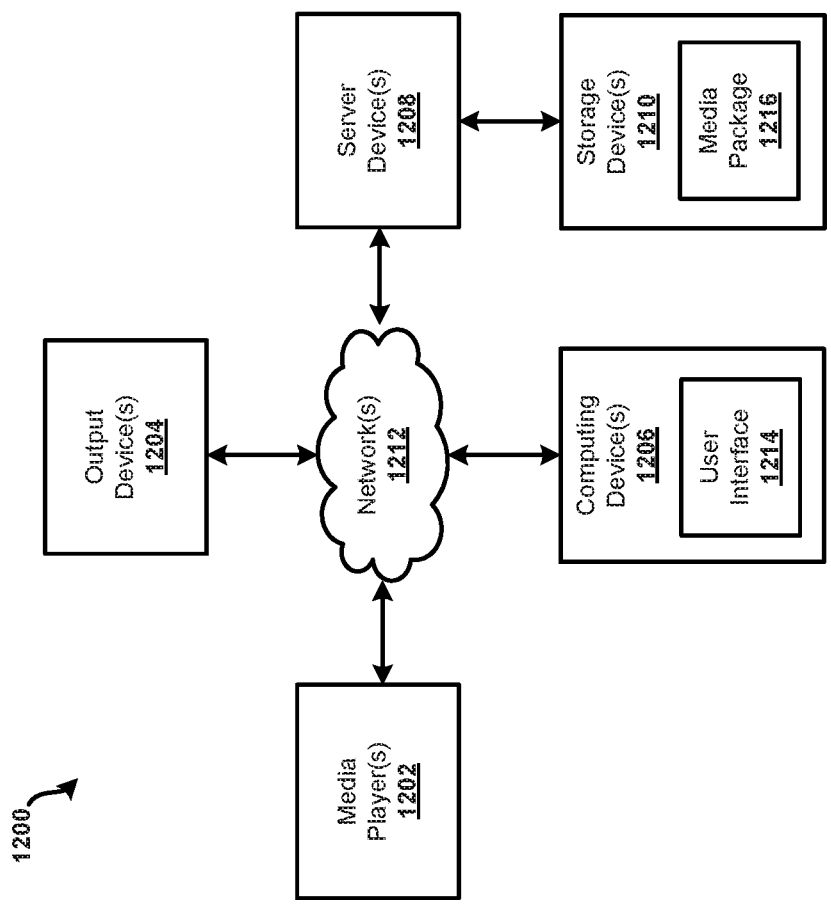
FIG. 12 shows an example networked environment in accordance with the disclosure.

In some embodiments, the controllers 1104*a-e* may be programmable so that first equipment 100 may be selectively configured to convey any of a variety of particular information to customers or individuals in a food service environment. Among other things, such an implementation may enable a number of levels of monetization. For example, referring now to FIG. 12, a networked environment 1200 is shown in accordance with the present disclosure. In this example, the networked environment 1200 may include a media player 1202, an output device 1204, a computing device 1206, a server device 1208, a storage device 1210, and a network 1212. Other embodiments are possible. For example, the networked environment 1200 may generally include more or fewer devices, networks, and other components as desired.

The media player 1202 may, for example, correspond to one of the controllers 1104*a-e* of FIG. 11, and the output device 1204 may, for example, correspond to one of the displays 122*a-e* incorporated within the first equipment 100 of FIG. 11. Other embodiments are possible. For example, in some embodiments, the output device 1204 may correspond to a particular speaker incorporated within the first equipment 100 of FIG. 11. Still other embodiments are possible.

The computing device 1206 and the server device 1208 may be configured as special-purpose computing devices. In particular, the server device 1208 may be configured as a business server that implements business processes, and the computing device 1206 may be a programmable machine configured to enable a user to access and/or implement functionality of the server device 1208. For example, the server device 1208 may host a web service or web site that may permit a user to define a media package 1216 via a user interface 1214 of the computing device 1206. Further, the server device 1208 may be configured to transfer the media package 1216 from the computing device 1206 to one or both of the media player 1202 and the output device 1204, so that the media player 1202 may enable a particular serving equipment (e.g., first equipment 100) to convey particular information to customers or individuals in a food service environment.

Figure 13:
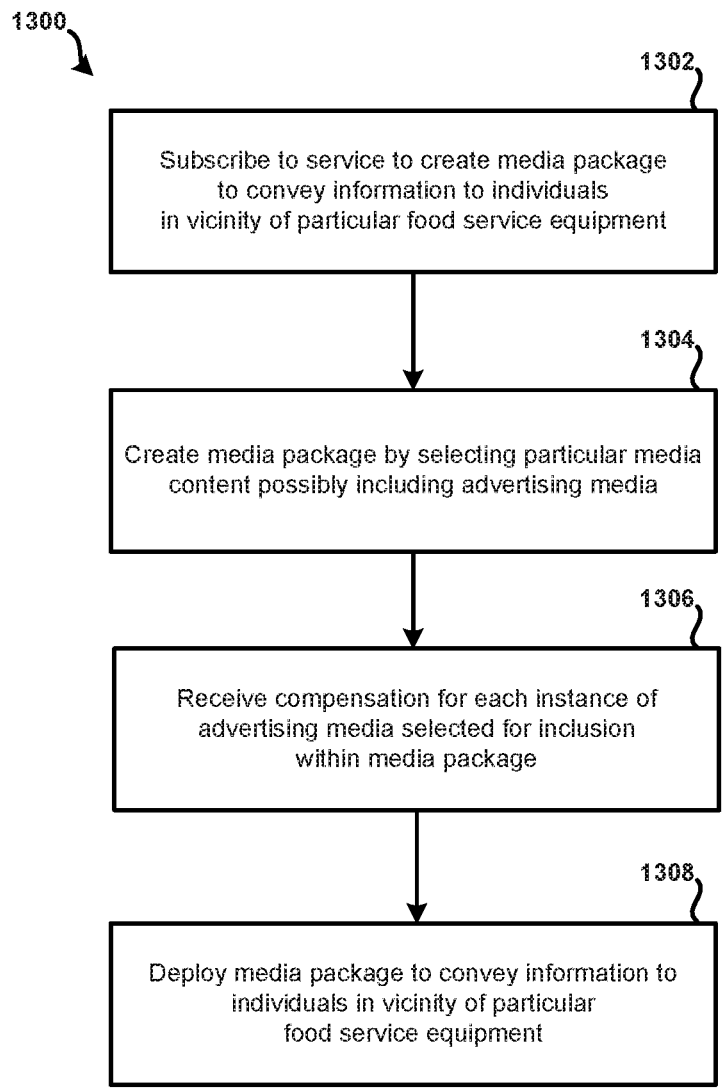
FIG. 13 shows an example method in accordance with the disclosure.

For example, referring now additionally to FIG. 13, an example method 1300 is shown in accordance with the present disclosure. In particular, at step 1302, a user may interact with the user interface 1214 to subscribe to a particular service implemented by the server device 1208 that allows a user to define the media package 1216. Such a feature may correspond to a first level of monetization, where a third party may enable an owner or operator of the first equipment 100 to select any number of various different types of media content to define the media package 1216. For example, at step 1304, a user may interact with the user interface 1214 to select any number of various different types of particular media or media content to define or create the media package 1216.

In general, the particular media or media content of the media package 1216 may refer to any type of one or more of audio content, video content, and image content that may be desired by an owner or operator of the first equipment 100 to convey to customers or individuals in a food service environment. For example, particular media or media content may include any one or more of audio content, video content, and image content associated with any type of broadcast media, such as news and weather. As another example, particular media or media content may include any one or more of audio content, video content, and image content associated with any type of advertising media, such as an advertisement of particular merchandise associated with or offered by the first equipment 100, and/or other items generally unassociated with the first equipment 100. As another example, particular media or media content may include any one or more of audio content, video content, and image content associated any type of social media, such as content about a certain "trend" or "trending" social topic. However, it is contemplated that many other types of forms of particular media or media content are possible.

In some embodiments, at step 1306, an owner or operator of the first equipment 100 may receive compensation at least for each instance of advertising media selected for inclusion within the media package 1216, as created at step 1304. Such a feature may correspond to a second level of monetization, where an owner or operator of the first equipment 100 may offset cost associated with creation and use of the media package 1216. Next, at step 1308, following creation of the media package 1216 and possibly receipt of compensation for each instance of advertising content selected for inclusion within the media package 1216, a user may interact with the user interface 1214 to deploy the media package 1216 to one or both of the media player 1202 and the output device 1204, so that the media player 1202 may enable a particular serving equipment (e.g., first equipment 100) to convey particular information to customers or individuals in a food service environment. Other embodiments are possible.

Figure 14:
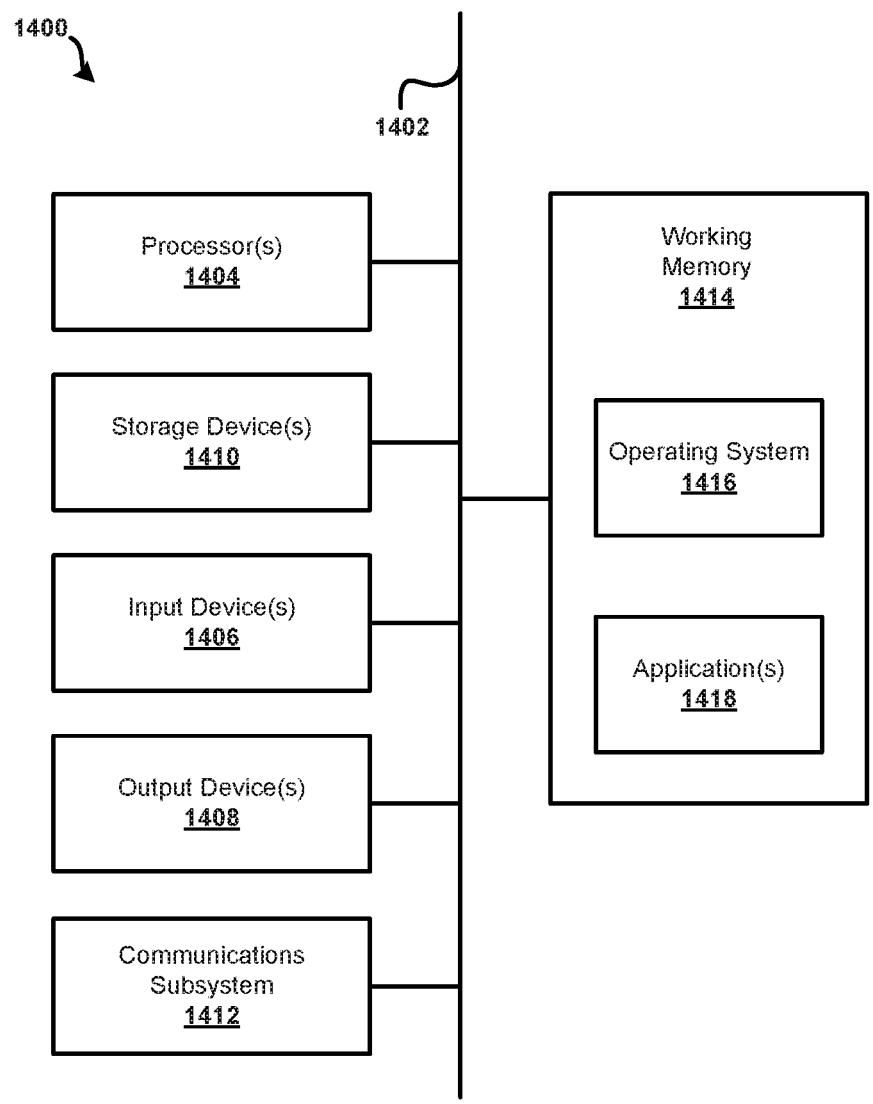
FIG. 14 shows an example computing system in accordance with the disclosure.

FIG. 14 shows an example computer system or device 1400 in accordance with the present disclosure. An example of a computer system or device includes an enterprise server, blade server, desktop computer, laptop computer, tablet computer, personal data assistant, smartphone, digital media player, and/or any other type of machine configured for performing calculations. The computer system 1400 may be wholly or at least partially incorporated as part of previously-described computing devices, such as the visual and/or audio devices as described above. The example computer device 1400 may be configured to perform and/or include instructions that, when executed, cause the computer system 1400 to perform one or more of the steps, operations, module, etc., of the example method 1300 of FIG. 13.

The computer device 1400 is shown comprising hardware elements that may be electrically coupled via bus 1402, or may otherwise be in communication by a hardwired and/or wireless connection as appropriate. The hardware elements may include a processing unit with at least one processor 1404 that may include without limitation one or more general-purpose processors and/or one or more special-purpose processors (such as digital signal processing chips, graphics acceleration processors, and/or the like); one or more input devices 1406, which can include without limitation a remote control, a mouse, a keyboard, and/or the like; and one or more output devices 1408, which can include without limitation a presentation device (e.g., television), a printer, and/or the like.

The computer system 1400 may further include and/or be in communication with at least one non-transitory storage device 1410, which may comprise, without limitation, local and/or network accessible storage, and/or can include, without limitation, a disk drive, a drive array, an optical storage device, a solid-state storage device, such as a random access memory, and/or a read-only memory, which can be programmable, flash-updateable, and/or the like. Such storage devices may be configured to implement any appropriate data stores, including without limitation, various file systems, database structures, and/or the like.

The computer device 1400 might also include a communications subsystem 1412, which can include without limitation a modem, a network card (wireless or wired), an infrared communication device, a wireless communication device, and/or a chipset (such as a Bluetooth™ device, a WiFi device, a WiMax device, cellular communication facilities (e.g., GSM, WCDMA, LTE, etc.), and/or the like. The communications subsystem 1412 may permit data to be exchanged with a network (such as the network described below, to name one example), other computer systems, and/or any other devices described herein. In many embodiments, the computer system 1400 will further comprise a working memory 1414, which may include a random access memory and/or a read-only memory device, as described above.

The computer device 1400 also can comprise software elements, shown as being currently located within the working memory 1414, including an operating system 1416, device drivers, executable libraries, and/or other code, such as one or more application programs 1418, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1410 described above. In some cases, the storage medium might be incorporated within a computer system, such as computer system 1400. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 1400 and/or might take the form of source and/or installable code, which, upon compilation and/or installation on the computer system 1400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 1400) to perform methods in accordance with various embodiments of the invention. According to a set of embodiments, some or all of the procedures of such methods are performed by the computer system 1400 in response to processor 1404 executing one or more sequences of one or more instructions (which might be incorporated into the operating system 1416 and/or other code, such as an application program 1418) contained in the working memory 1414. Such instructions may be read into the working memory 1414 from another computer-readable medium, such as one or more of the storage device(s) 1410. Merely by way of example, execution of the sequences of instructions contained in the working memory 1414 may cause the processor(s) 1404 to perform one or more procedures of the methods described herein.

The terms "machine-readable medium" and "computer-readable medium," as used within the present disclosure, may refer to any non-transitory medium that participates in providing data that causes a machine to operate in a specific fashion. In an embodiment implemented using the computer device 1400, various computer-readable media might be involved in providing instructions/code to processor(s) 1404 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1410. Volatile media may include, without limitation, dynamic memory, such as the working memory 1414.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1404 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1400.

The communications subsystem 1412 (and/or components thereof) generally will receive signals, and the bus 1402 then might carry the signals (and/or the data, instructions, etc. carried by the signals) to the working memory 1414, from which the processor(s) 1404 retrieves and executes the instructions. The instructions received by the working memory 1414 may optionally be stored on a non-transitory storage device 1410 either before or after execution by the processor(s) 1404.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations and including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for conveying information by food service equipment, comprising:
   providing a food service system, wherein said food service system comprises a hygienic shield system including a frame that is coupled to a serving surface of the food service system, and at least one transparent panel that is coupled to the frame, and wherein the food service system further comprises at least one media device that is incorporated within and operably coupled to the food service system, and a computing device configured to select from a local memory a media file for playback by the media device, wherein the food service system is configured to display and protect previously-prepared food items; and
   accessing by the computing device the media file from the local memory to playback one of audio and video of the at least one media file to one or more customers in a food service environment as the one or more customers observe, are served, or serve themselves previously-prepared items from the food service system.

2. The method of claim 1, further comprising outputting video of the media file for presentation by a display device coupled to the food service system.

3. The method of claim 1, further comprising outputting audio of the media file for reproduction by a speaker coupled to the food service system.

4. The method of claim 1, further comprising reporting a number of times of accessing of the media file to determine reimbursement for playback of the one of audio and video of the media file.

5. The method of claim 1, further comprising accessing a server system communicatively coupled to the computing device to subscribe to a service for defining the media file.

6. The method of claim 1, further comprising mounting the media device to the frame of the hygienic shield system.

7. The method of claim 1, further comprising integrating the media device into the transparent panel of the hygienic shield system.

8. The method of claim 1, further comprising mounting the media device on the transparent panel of the hygienic shield system.

9. The method of claim 1, further comprising integrating the media device into the serving surface of the food service equipment.

10. The method of claim 1, further comprising mounting the media device on the serving surface of the food service equipment.

11. The method of claim 1, further comprising rigidly coupling the transparent panel of the hygienic shield system to the frame.

12. The method of claim 1, further comprising adjustably coupling the transparent panel of the hygienic shield system to the frame.

13. The method of claim 1, further comprising providing the food service system with a cabinet, wherein the serving surface is mounted to the cabinet, and the computing device is mounted within the cabinet.

14. The method of claim 1, further comprising providing at least one food tray mounted to the serving surface.

15. The method of claim 1, further comprising providing at least one beverage dispenser mounted to the serving surface.

16. The method of claim 1 further comprising accepting payment from a customer with the computing device.

17. The method of claim 1, further comprising mounting at least one beverage dispenser to the countertop.

18. The method of claim 1, further comprising accepting payment from a customer with a computing device operatively associated with the food service equipment.

19. A method for conveying information comprising:
providing a food service equipment configured to display and protect previously-prepared food items, the food service equipment comprising, a cabinet assembly including an internal compartment and a countertop, a hygienic shield including at least one post coupled to the countertop, and at least one panel coupled to the at least one post, at least one media output device that is operably coupled with the food service equipment, the media output device configured to playback one of audio and video of at least one media file, and at least one media player to select the one of audio and video of at least one media file for playback by the media output device, wherein the at least one media player is communicatively coupled to the at least one media output device; and
accessing by the media player the media file to playback one of audio and video of the at least one media file to one or more customers, through the media output device, in a food service environment as the one or more customers observe, are served, or serve themselves items from the food service equipment.

20. The method of claim 19, further comprising mounting at least one food tray to the countertop.

* * * * *